United States Patent
Chen et al.

(10) Patent No.: US 8,957,846 B2
(45) Date of Patent: Feb. 17, 2015

(54) TOUCH DISPLAY HAVING IN-PLANE-SWITCHING LIQUID CRYSTAL STRUCTURE

(71) Applicant: Rich IP Technology Inc., Taipei (TW)

(72) Inventors: Han-Chang Chen, Taipei (TW); Yen-Hung Tu, Taipei (TW); Chung-Lin Chia, Taipei (TW); Jen-Chieh Chang, Taipei (TW); Chih-Wen Wu, Taipei (TW)

(73) Assignee: Rich IP Technology Inc., Taipei (TW)

( * ) Notice: Subject to any disclaimer, the term of this patent is extended or adjusted under 35 U.S.C. 154(b) by 43 days.

(21) Appl. No.: 14/020,418

(22) Filed: Sep. 6, 2013

(65) Prior Publication Data

US 2014/0320444 A1    Oct. 30, 2014

(30) Foreign Application Priority Data

Apr. 25, 2013    (TW) .............................. 102114879 U

(51) Int. Cl.
*G09G 3/36* (2006.01)
*G06F 3/044* (2006.01)
*G06F 3/041* (2006.01)

(52) U.S. Cl.
CPC .............. *G06F 3/044* (2013.01); *G06F 3/0412* (2013.01)
USPC .............. 345/104; 345/173; 345/174; 349/12

(58) Field of Classification Search
CPC ........ G06F 3/0412; G06F 3/044; G06F 3/016
USPC ............................ 345/104, 173–174; 349/12
See application file for complete search history.

(56) References Cited

U.S. PATENT DOCUMENTS

| | | | |
|---|---|---|---|
| 8,432,371 B2 * | 4/2013 | Hotelling et al. | 345/173 |
| 8,654,083 B2 * | 2/2014 | Hotelling et al. | 345/173 |
| 2008/0062140 A1 * | 3/2008 | Hotelling et al. | 345/173 |
| 2008/0062148 A1 * | 3/2008 | Hotelling et al. | 345/174 |
| 2013/0057511 A1 * | 3/2013 | Shepelev et al. | 345/174 |
| 2014/0146005 A1 * | 5/2014 | Hong et al. | 345/174 |

* cited by examiner

*Primary Examiner* — Lun-Yi Lao
*Assistant Examiner* — Kelly B Hegarty
(74) *Attorney, Agent, or Firm* — Ming Chow; Sinorica, LLC

(57) ABSTRACT

A touch display having in-plane-switching liquid crystal structure, comprising a pixel cell and a multiplexer circuit, wherein the multiplexer circuit is used to couple a source driver unit with the pixel cell to provide an in-plane switching display function during a display period, and couple a touch control unit with the pixel cell to provide a touch detection function during a touch detection period.

16 Claims, 18 Drawing Sheets

TOUCH DISPLAY HAVING IN-PLANE-SWITCHING LIQUID CRYSTAL STRUCTURE

The current application claims a foreign priority to the patent application of Taiwan No. 102114879 filed on Apr. 25, 2013.

BACKGROUND OF THE INVENTION

1. Field of the Invention

The present invention relates to a touch apparatus, especially to a touch display having an IPS (in plane switching) liquid crystal structure.

2. Description of the Related Art

General touch screen apparatuses have a touch module stacked on a liquid crystal screen. However, this kind of touch screen apparatuses tends to have larger depths, which can fail to meet the market requirements on lightness and thinness, and can result in higher material cost.

To cope with this issue, one solution is to integrate two layers of same material, of which one layer belongs to a liquid crystal screen and the other layer belongs to a touch module, into a single layer. However, the depth of a touch screen apparatus reduced by this kind of designs still cannot meet the requirements of some high end products.

Another solution is to integrate a touch function into a liquid crystal display, generally by adding extra electrodes on a thin film transistor layer to form touch capacitors. However, this kind of designs tends to reduce product yield rate and increase manufacturing cost.

To solve the foregoing problems, a novel, slim, and easy-to-manufacture touch screen apparatus is needed.

SUMMARY OF THE INVENTION

One objective of the present invention is to disclose a touch display having an IPS liquid crystal structure, which is capable of utilizing the IPS liquid crystal structure to provide a touch function.

Another objective of the present invention is to disclose a touch display having an IPS liquid crystal structure, which is capable of utilizing two electrode layers of the IPS liquid crystal structure to perform a self-capacitor touch detection procedure or a mutual-capacitor touch detection procedure.

Another objective of the present invention is to disclose a touch display having an IPS liquid crystal structure, which is capable of utilizing a pixel electrode layer, a counter electrode layer, and a protection electrode layer of the IPS liquid crystal structure to perform a self-capacitor touch detection procedure or a mutual-capacitor touch detection procedure.

Another objective of the present invention is to disclose a touch display having an IPS liquid crystal structure, which is capable of utilizing a bias voltage technique to promote the reliability of touch detection.

Another objective of the present invention is to disclose a touch display having an IPS liquid crystal structure, which is capable of providing dual touch planes.

Still another objective of the present invention is to disclose a touch display having an IPS liquid crystal structure, which is capable of simplifying the structure of a touch screen to reduce the depth, promote the yield rate, and cut down the cost thereof.

To attain the foregoing objectives, a touch display having an IPS liquid crystal structure is proposed, which has a pixel cell and a multiplexer circuit for providing a display function and a touch sensing function, the pixel cell including:

a first substrate;

a counter electrode located on the first substrate;

a storage capacitor bottom electrode located on the first substrate and separated from the counter electrode;

a storage capacitor connection line coupled electrically with the storage capacitor bottom electrode;

a counter electrode connection line coupled electrically with the counter electrode;

an insulation layer located on the counter electrode and on the storage capacitor bottom electrode;

a thin film transistor located on the insulation layer and having a gate, a source, and a drain;

a pixel electrode located on the insulation layer and coupled electrically with the drain;

a storage capacitor top electrode located on the insulation layer and coupled electrically with the pixel electrode;

a gate connection line coupled electrically with the gate;

a source connection line coupled electrically with the source; and a liquid crystal layer located on the thin film transistor, on the pixel electrode, and on the storage capacitor top electrode; and the multiplexer circuit including:

a first multiplexer having a first contact, a second contact, and a third contact, wherein the first contact is coupled with the source connection line, the second contact is coupled with a source driver unit, and the third contact is coupled with a touch control unit, and the first contact is coupled electrically with the second contact during a display period, and coupled electrically with the third contact during a touch detection period;

a second multiplexer having a fourth contact, a fifth contact, and a sixth contact, wherein the fourth contact is coupled with the storage capacitor connection line, the fifth contact is coupled with a common voltage, and the sixth contact is coupled with the touch control unit, and the fourth contact is coupled electrically with the fifth contact during the display period, and coupled electrically with the sixth contact during the touch detection period; and a third multiplexer having a seventh contact, an eighth contact, and a ninth contact, wherein the seventh contact is coupled with the counter electrode connection line, the eighth contact is coupled with the common voltage, and the ninth contact is coupled with the touch control unit, and the seventh contact is coupled electrically with the eighth contact during the display period, and coupled electrically with the ninth contact during the touch detection period.

In one embodiment, the pixel cell further includes:

a protection electrode on the liquid crystal layer; and a protection electrode connection line coupled electrically with the protection electrode and with the touch control unit.

In one embodiment, the pixel cell further includes a second substrate on the liquid crystal layer.

In one embodiment, the pixel cell further includes a second substrate on the protection electrode.

To attain the foregoing objectives, another touch display having IPS liquid crystal structure is proposed, including:

a pixel array having plural external source connection lines, plural external gate connection lines, plural external storage capacitor connection lines, and plural pixel cells, each of the plural pixel cells including:

a first substrate;

a counter electrode located on the first substrate;

a storage capacitor bottom electrode located on the first substrate and coupled electrically with the counter electrode;

a storage capacitor connection line coupled electrically with the counter electrode, with the storage capacitor bottom electrode, and with one of the plural external storage capacitor connection lines;

an insulation layer located on the counter electrode and on the storage capacitor bottom electrode;

a thin film transistor located on the insulation layer and having a gate, a source, and a drain;

a pixel electrode located on the insulation layer and coupled electrically with the drain;

a storage capacitor top electrode located on the insulation layer and coupled electrically with the pixel electrode;

a gate connection line coupled electrically with the gate and with one of the plural external gate connection lines;

a source connection line coupled electrically with the source and with one of the plural external source connection lines; and a liquid crystal layer located on the thin film transistor, on the pixel electrode, and on the storage capacitor top electrode;

a gate driver unit coupled with the plural external gate connection lines;

a multiplexer circuit coupled with the plural external source connection lines and with the plural external storage capacitor connection lines;

a source driver unit coupled with the multiplexer circuit; and a touch control unit coupled with the multiplexer circuit;

wherein the multiplexer circuit couples the source driver unit with the plural external source connection lines and with the plural external storage capacitor connection lines during a display period, and couples the touch control unit with the plural external source connection lines and with the plural external storage capacitor connection lines during a touch detection period.

In one embodiment, the touch control unit executes a touch detection procedure during the touch detection period, the touch detection procedure being selected from a group consisting of a self-capacitor touch detection procedure, a mutual-capacitor touch detection procedure, and any combination thereof.

In one embodiment, each of the plural pixel cells further includes:

plural protection electrodes located on the liquid crystal layer; and plural external protection electrode connection lines, each of which being coupled electrically with the plural protection electrodes and with the multiplexer circuit;

wherein the plural external protection electrode connection lines are coupled to the touch control unit via the multiplexer circuit.

In one embodiment, the touch control unit executes a touch detection procedure during the touch detection period, the touch detection procedure being selected from a group consisting of a self-capacitor touch detection procedure, a mutual-capacitor touch detection procedure, and any combination thereof.

In one embodiment, each of the plural pixel cells further includes a second substrate on the liquid crystal layer.

In one embodiment, each of the plural pixel cells further includes a second substrate on the protection electrode.

To attain the foregoing objectives, still another touch display having IPS liquid crystal structure is proposed, including:

a pixel array having plural external source connection lines, plural external gate connection lines, plural external storage capacitor connection lines, plural external counter electrode connection lines, and plural pixel cells, each of the plural pixel cells including:

a first substrate;

a counter electrode located on the first substrate;

a storage capacitor bottom electrode located on the first substrate and separated from the counter electrode;

a storage capacitor connection line coupled electrically with the storage capacitor bottom electrode and with one of the plural external storage capacitor connection lines;

a counter electrode connection line coupled electrically with the counter electrode and with one of the plural external counter electrode connection lines;

an insulation layer located on the counter electrode and the storage capacitor bottom electrode;

a thin film transistor located on the insulation layer and having a gate, a source, and a drain;

a pixel electrode located on the insulation layer and coupled electrically with the drain;

a storage capacitor top electrode located on the insulation layer and coupled electrically with the pixel electrode;

a gate connection line coupled electrically with the gate and with one of the plural external gate connection lines;

a source connection line coupled electrically with the source and with one of the plural external source connection lines; and a liquid crystal layer located on the thin film transistor, on the pixel electrode, and on the storage capacitor top electrode;

a gate driver unit coupled with the plural external gate connection lines;

a multiplexer circuit coupled with the plural external source connection lines, with the plural external storage capacitor connection lines, and with the plural external counter electrode connection lines;

a source driver unit coupled with the multiplexer circuit; and a touch control unit coupled with the multiplexer circuit;

wherein the multiplexer circuit couples the source driver unit with the plural external source connection lines, with the plural external storage capacitor connection lines, and with the plural external counter electrode connection lines during a display period, and couples the touch control unit with the plural external source connection lines, with the plural external storage capacitor connection lines, and with the plural external counter electrode connection lines during a touch detection period.

In one embodiment, the touch control unit executes a touch detection procedure during the touch detection period, the touch detection procedure being selected from a group consisting of a self-capacitor touch detection procedure, a mutual-capacitor touch detection procedure, and any combination thereof.

In one embodiment, each of the plural pixel cells further includes:

plural protection electrodes located on the liquid crystal layer; and plural external protection electrode connection lines, each of which being coupled electrically with one of the plural protection electrodes and with the multiplexer circuit;

wherein the plural external protection electrode connection lines are coupled to the touch control unit via the multiplexer circuit.

In one embodiment, the touch control unit executes a touch detection procedure during the touch detection period, the touch detection procedure being selected from a group consisting of a self-capacitor touch detection procedure, a mutual-capacitor touch detection procedure, and any combination thereof.

In one embodiment, each of the plural pixel cells further includes a second substrate on the liquid crystal layer.

In one embodiment, each of the plural pixel cells further includes a second substrate on the protection electrode.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
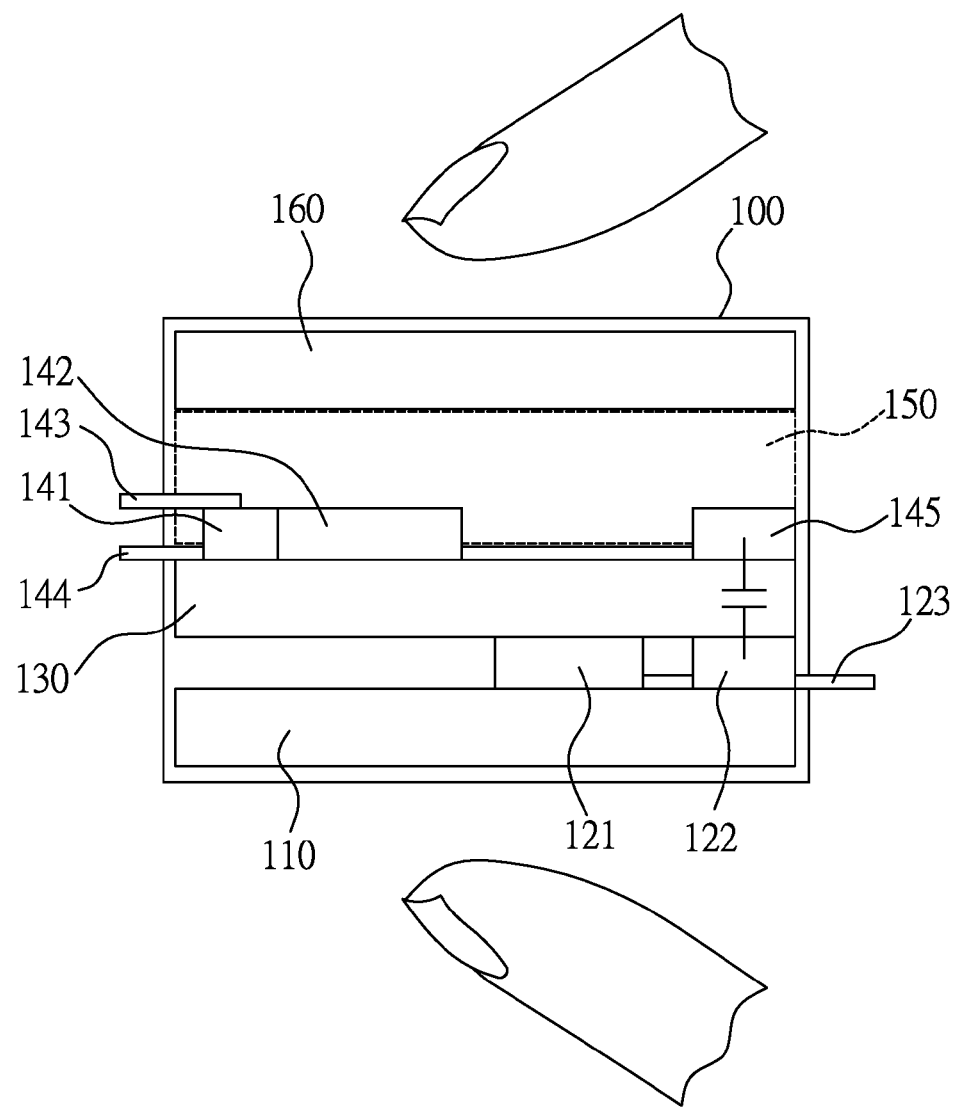
FIG. 1 illustrates the structure of an embodiment of a pixel cell of the present invention.

Please refer to FIG. 1, which illustrates the structure of an embodiment of a pixel cell of the present invention. As illustrated in FIG. 1, a pixel cell 100 includes a first substrate 110, a counter electrode 121, a storage capacitor bottom electrode 122, a storage capacitor connection line 123, an insulation layer 130, a thin film transistor 141, a pixel electrode 142, a source connection line 143, a gate connection line 144, a storage capacitor top electrode 145, a liquid crystal layer 150, and a second substrate 160.

The first substrate 110 is preferably a glass substrate for providing a first touch plane.

The counter electrode 121 is located on the first substrate 110 and can be for example but not limited to an ITO (Indium Tin Oxide) electrode, a nano-carbon electrode, or a nano-silver electrode.

The storage capacitor bottom electrode 122 is located on the first substrate and coupled electrically with the counter electrode 121, and can be for example but not limited to an ITO (Indium Tin Oxide) electrode, a nano-carbon electrode, or a nano-silver electrode.

The storage capacitor connection line 123 can be implemented with for example but not limited to metal, and is coupled electrically with the counter electrode 121 and the storage capacitor bottom electrode 122.

The insulation layer 130 is implemented with a transparent dielectric material, and located on the counter electrode 121 and on the storage capacitor bottom electrode 122.

The thin film transistor 141 is located on the insulation layer 130 and has a source, a gate, and a drain.

The pixel electrode 142, preferably an ITO electrode, is located on the insulation layer 130 and coupled electrically with the drain, and is not facing the counter electrode 121.

The source connection line 143 can be made of, for example but not limited to, metal, and is coupled electrically with the source.

The gate connection line 144 can be made of, for example but not limited to, metal, and is coupled electrically with the gate.

The storage capacitor top electrode 145 is located on the insulation layer 130 and coupled electrically with the pixel electrode 142, and can be, for example but not limited to, an ITO electrode, a nano-carbon electrode, or a nano-silver electrode.

The liquid crystal layer 150 is located on the thin film transistor 141, on the pixel electrode 142, and on the storage capacitor top electrode 145.

The second substrate 160 is located on the liquid crystal layer 150, and is preferably a glass substrate for providing a second touch plane, that is, the structure of FIG. 1 can provide dual touch planes.

Figure 2A:
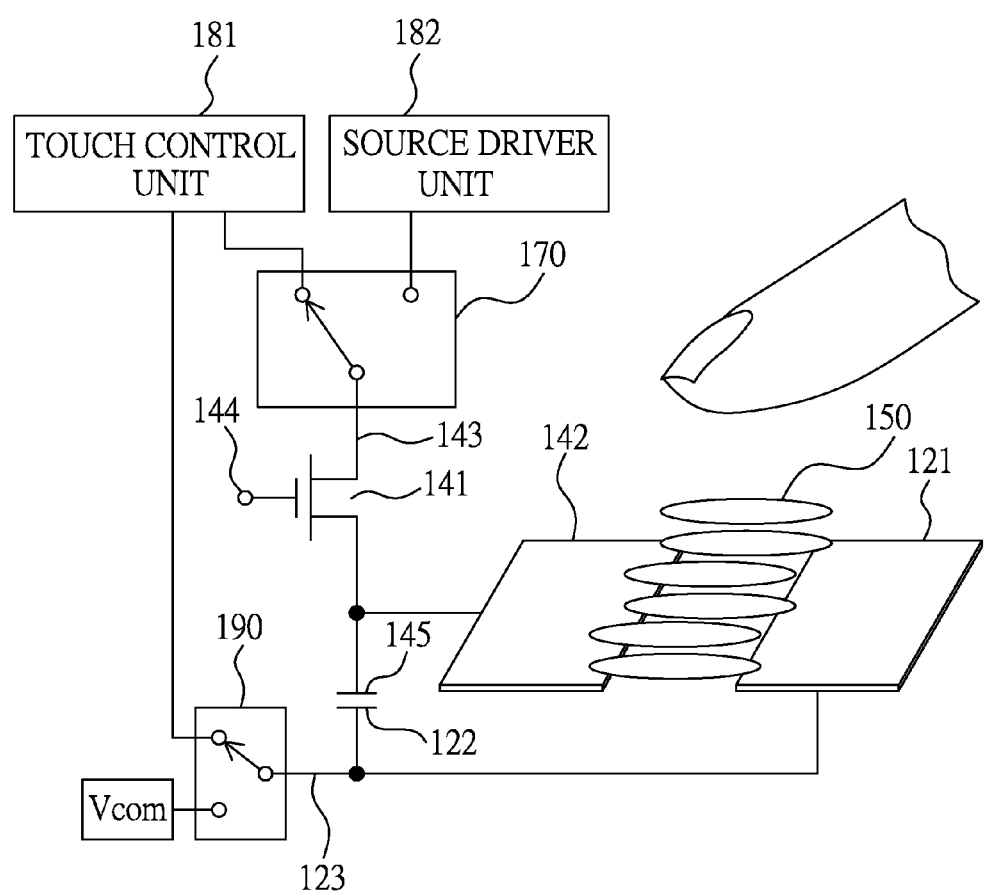
FIG. 2(a) illustrates an embodiment of a touch display having IPS liquid crystal structure of the present invention.

Please refer to FIG. 2(a), which illustrates an embodiment of a touch display having IPS liquid crystal structure of the present invention. As illustrated in FIG. 2(a), the touch display utilizes a multiplexer circuit to cooperate with the pixel cell of FIG. 1 to provide an IPS display function and a touch function. The multiplexer circuit includes a first multiplexer 170 and a second multiplexer 190.

The first multiplexer 170 has a first contact, a second contact, and a third contact, wherein, the first contact is coupled with the source connection line 143, the second contact is coupled with a source driver unit 182, and the third contact is coupled with a touch control unit 181; and the first contact is coupled electrically with the second contact during a display period, and the first contact is coupled electrically with the third contact during a touch detection period.

The second multiplexer 190 has a fourth contact, a fifth contact, and a sixth contact, wherein, the fourth contact is coupled with the storage capacitor connection line 123, the fifth contact is coupled with a common voltage $V_{com}$, and the sixth contact is coupled with the touch control unit 181; and the fourth contact is coupled electrically with the fifth contact during the display period, and the fourth contact is coupled electrically with the sixth contact during the touch detection period.

Figure 2B:
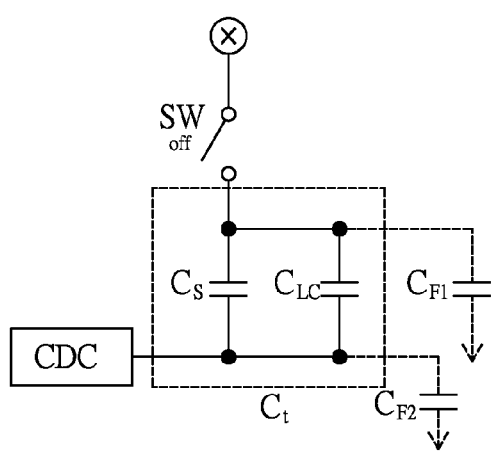
FIG. 2(b)-2(c) illustrate two embodiments of a self-capacitor touch detection mode of the architecture of FIG. 2(a).

The architecture of FIG. 2(a) can provide a self-capacitor touch detection mode and a mutual-capacitor touch detection mode. Please refer to FIG. 2(b), which illustrates an embodiment of the self-capacitor touch detection mode of the architecture of FIG. 2(a). In a capacitor network illustrated in FIG. 2(b), $C_S$ is a capacitor defined by the storage capacitor bottom electrode 122 and the storage capacitor top electrode 145, $C_{LC}$ is a capacitor defined by the counter electrode 121 and the pixel electrode 142, $C_t$ is an effective capacitor formed by $C_S$ and $C_{LC}$, $C_{F1}$ is a capacitor induced when a finger is approaching the pixel electrode 142, and $C_{F2}$ is a capacitor induced when a finger is approaching the counter electrode 121. The touch control unit 181 performs a CDC (charge to digital conversion) operation on the capacitor network via the storage capacitor connection line 123 to detect touch events.

Figure 2C:
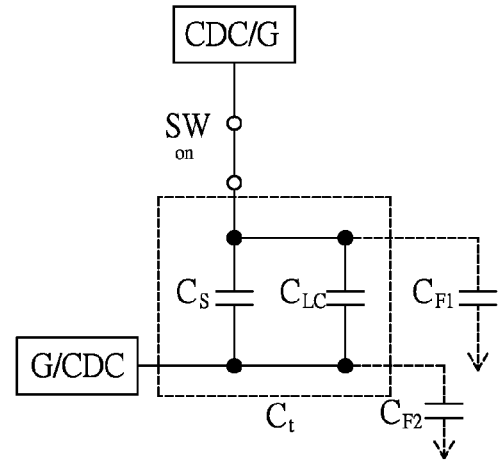

FIG. 2(c) illustrates another embodiment of the self-capacitor touch detection mode of the architecture of FIG. 2(a). In a capacitor network illustrated in FIG. 2(c), $C_S$ is a capacitor defined by the storage capacitor bottom electrode 122 and the storage capacitor top electrode 145, $C_{LC}$ is a capacitor defined by the counter electrode 121 and the pixel electrode 142, $C_t$ is an effective capacitor formed by $C_S$ and $C_{LC}$, $C_{F1}$ is a capacitor induced when a finger is approaching the pixel electrode 142, and $C_{F2}$ is a capacitor induced when a finger is approaching the counter electrode 121. The touch control unit 181 performs a CDC (charge to digital conversion) operation on the capacitor network via the storage capacitor connection line 123 or via the source connection line 143 to detect touch events.

Figure 2D:
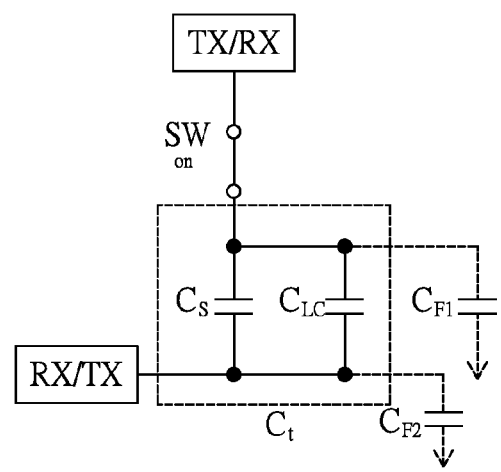
FIG. 2(d) illustrates an embodiment of a mutual-capacitor touch detection mode of the architecture of FIG. 2(a).

FIG. 2(d) illustrates an embodiment of the mutual-capacitor touch detection mode of the architecture of FIG. 2(a). In a capacitor network illustrated in FIG. 2(d), $C_S$ is a capacitor defined by the storage capacitor bottom electrode 122 and the storage capacitor top electrode 145, $C_{LC}$ is a capacitor defined by the counter electrode 121 and the pixel electrode 142, $C_t$ is an effective capacitor formed by $C_S$ and $C_{LC}$, $C_{F1}$ is a capacitor induced when a finger is approaching the pixel electrode 142, and $C_{F2}$ is a capacitor induced when a finger is approaching the counter electrode 121. The touch control unit 181 uses the storage capacitor connection line 123 as a signal transmitting end TX and uses the source connection line 143 as a signal receiving end RX, or uses the source connection line 143 as a signal transmitting end TX and uses the storage capacitor connection line 123 as a signal receiving end RX, to detect touch events.

Figure 3:
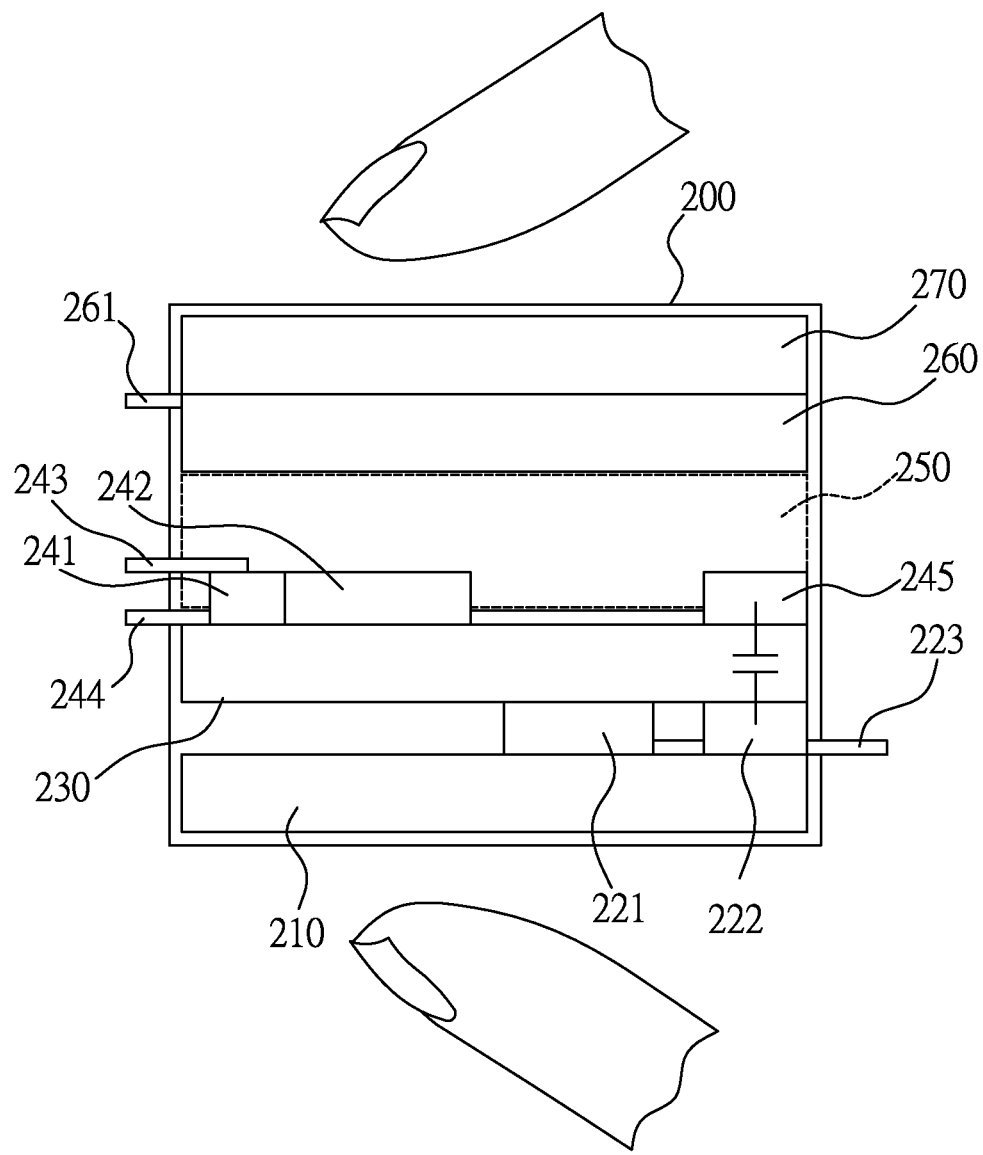
FIG. 3 illustrates the structure of another embodiment of the pixel cell of the present invention.

Please refer to FIG. 3, which illustrates the structure of another embodiment of the pixel cell of the present invention. As illustrated in FIG. 3, a pixel cell 200 includes a first substrate 210, a counter electrode 221, a storage capacitor bottom electrode 222, a storage capacitor connection line 223, an insulation layer 230, a thin film transistor 241, a pixel electrode 242, a source connection line 243, a gate connection line 244, a storage capacitor top electrode 245, a liquid crystal layer 250, a protection electrode 260, a protection electrode connection line 261, and a second substrate 270.

The first substrate 210 is preferably a glass substrate for providing a first touch plane.

The counter electrode 221 is located on the first substrate 210 and can be, for example but not limited to, an ITO electrode, a nano-carbon electrode, or a nano-silver electrode.

The storage capacitor bottom electrode 222 is located on the first substrate 210 and coupled electrically with the counter electrode 221, and can be, for example but not limited to, an ITO electrode, a nano-carbon electrode, or a nano-silver electrode.

The storage capacitor connection line 223 can be made of, for example but not limited to, metal, and is coupled electrically with the counter electrode 221 and with the storage capacitor bottom electrode 222.

The insulation layer 230 is made of a transparent dielectric material, and located on the counter electrode 221 and on the storage capacitor bottom electrode 222.

The thin film transistor 241 is located on the insulation layer 230 and has a source, a gate, and a drain.

The pixel electrode 242, preferably an ITO electrode, is located on the insulation layer 230 and coupled electrically with the drain, and is not facing the counter electrode 221.

The source connection line 243 can be made of, for example but not limited to, metal, and is coupled electrically with the source.

The gate connection line 244 can be, for example but not limited to, metal, and is coupled electrically with the gate.

The storage capacitor top electrode 245 is located on the insulation layer 230 and coupled electrically with the pixel electrode 242, and can be, for example but not limited to an ITO electrode, a nano-carbon electrode, or a nano-silver electrode.

The liquid crystal layer 250 is located on the thin film transistor 241, on the pixel electrode 242, and on the storage capacitor top electrode 245.

The protection electrode 260 is located on the liquid crystal layer 250, and is a transparent electrode, which can be implemented by ITO.

The protection electrode connection line 261 can be made of, for example but not limited to, metal, and is coupled electrically with the protection electrode 260.

The second substrate 270 is preferably a glass substrate, and is located on the protection electrode 260 for providing a second touch plane, that is, the structure of FIG. 3 can provide dual touch planes.

Figure 4A:
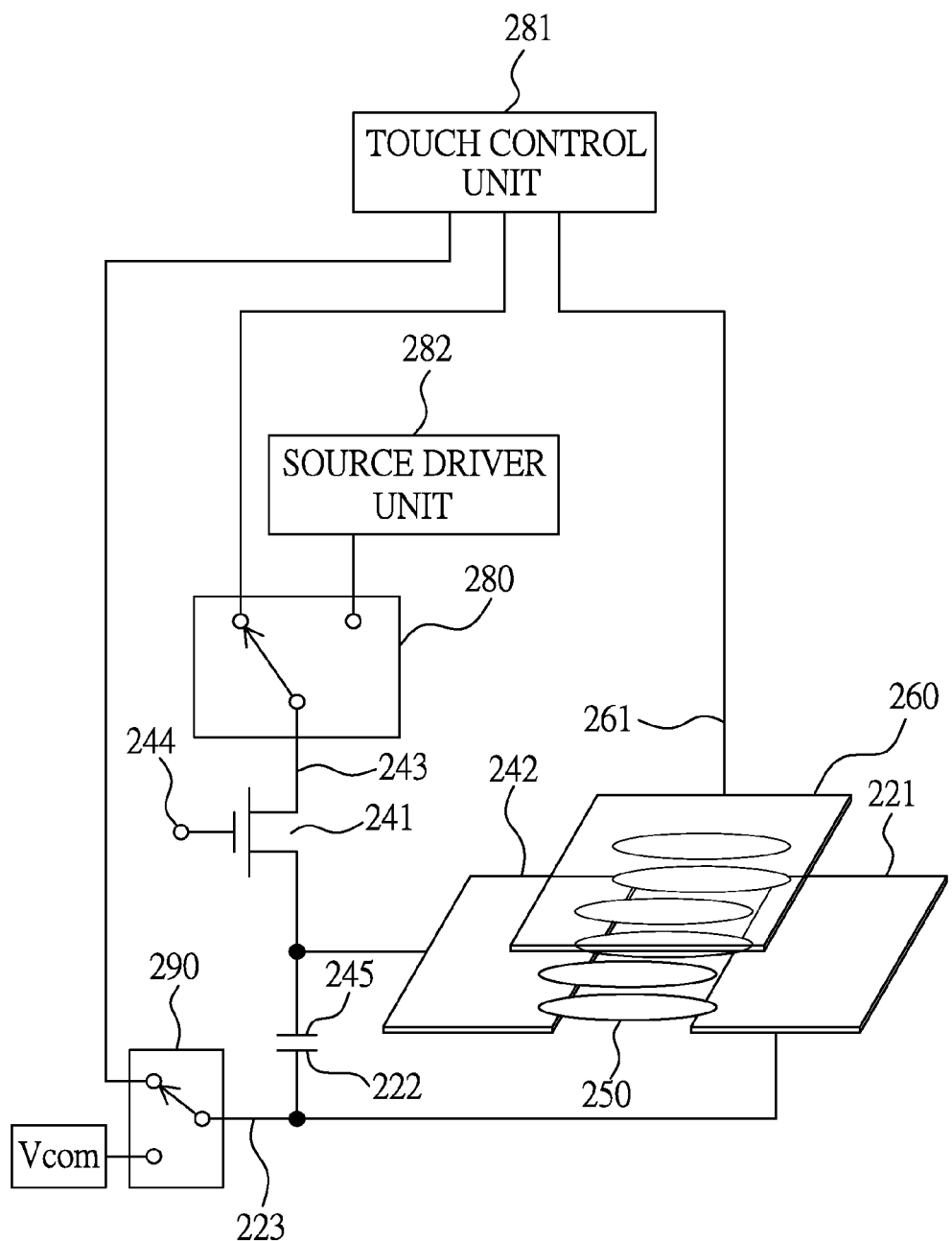
FIG. 4(a) illustrates another embodiment of the touch display having IPS liquid crystal structure of the present invention.

Please refer to FIG. 4(a), which illustrates another embodiment of a touch display having IPS liquid crystal structure of the present invention. As illustrated in FIG. 4(a), the touch display utilizes a multiplexer circuit to cooperate with the pixel cell of FIG. 3 to provide an IPS display function and a touch function. The multiplexer circuit includes a first multiplexer 280 and a second multiplexer 290.

The first multiplexer 280 has a first contact, a second contact, and a third contact, wherein, the first contact is coupled with the source connection line 243, the second contact is coupled with a source driver unit 282, and the third contact is coupled with a touch control unit 281; and the first contact is coupled electrically with the second contact during a display period, and the first contact is coupled electrically with the third contact during a touch detection period.

The second multiplexer 290 has a fourth contact, a fifth contact, and a sixth contact, wherein, the fourth contact is coupled with the storage capacitor connection line 223, the fifth contact is coupled with a common voltage $V_{com}$, and the sixth contact is coupled with the touch control unit 281; and the fourth contact is coupled electrically with the fifth contact during the display period, and the fourth contact is coupled electrically with the sixth contact during the touch detection period.

Besides, the protection electrode connection line 261 is coupled with the touch control unit 281 to provide both an ESD (electrostatic discharge) path and a touch detection path.

Figure 4B:
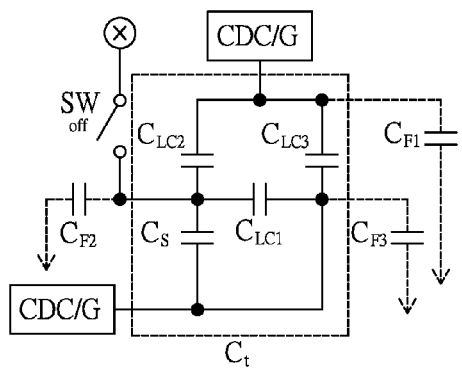
FIG. 4(b)-4(c) illustrate two embodiments of a self-capacitor touch detection mode of the architecture of FIG. 4(a).

The architecture of FIG. 4(a) can provide a self-capacitor touch detection mode and a mutual-capacitor touch detection mode. Please refer to FIG. 4(b), which illustrates an embodiment of the self-capacitor touch detection mode of the architecture of FIG. 4(a). In a capacitor network illustrated in FIG. 4(b), $C_S$ is a capacitor defined by the storage capacitor bottom electrode 222 and the storage capacitor top electrode 245, $C_{LC1}$ is a capacitor defined by the counter electrode 221 and the pixel electrode 242, $C_{LC2}$ is a capacitor defined by the pixel electrode 242 and the protection electrode 260, $C_{LC3}$ is a capacitor defined by the counter electrode 221 and the protection electrode 260, $C_t$ is an effective capacitor formed by $C_S$, $C_{LC1}$, $C_{LC2}$, and $C_{LC3}$, $C_{F1}$ is a capacitor induced when a finger is approaching the protection electrode 260, $C_{F2}$ is a capacitor induced when a finger is approaching the pixel electrode 242, and $C_{F3}$ is a capacitor induced when a finger is approaching the counter electrode 221. The touch unit 281 performs a CDC (charge to digital conversion) operation on the capacitor network via the storage capacitor connection line 223 or via the protection electrode connection line 261, to detect touch events.

Figure 4C:
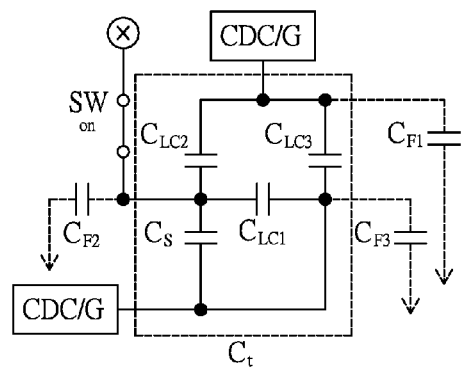

FIG. 4(c) illustrates another embodiment of the self-capacitor touch detection mode of the architecture of FIG. 4(a). In a capacitor network illustrated in FIG. 4(c), $C_S$ is a capacitor defined by the storage capacitor bottom electrode 222 and the storage capacitor top electrode 245, $C_{LC1}$ is a capacitor defined by the counter electrode 221 and the pixel electrode 242, $C_{LC2}$ is a capacitor defined by the pixel electrode 242 and the protection electrode 260, $C_{LC3}$ is a capacitor defined by the counter electrode 221 and the protection electrode 260, $C_t$ is an effective capacitor formed by $C_S$, $C_{LC1}$, $C_{LC2}$, and $C_{LC3}$, $C_{F1}$ is a capacitor induced when a finger is approaching the protection electrode 260, $C_{F2}$ is a capacitor induced when a finger is approaching the pixel electrode 242, and $C_{F3}$ is a capacitor induced when a finger is approaching the counter electrode 221. The touch unit 281 performs a CDC (charge to digital conversion) operation on the capacitor network via the storage capacitor connection line 223, the protection electrode connection line 261, or the source connection line 243, to detect touch events.

Figure 4D:
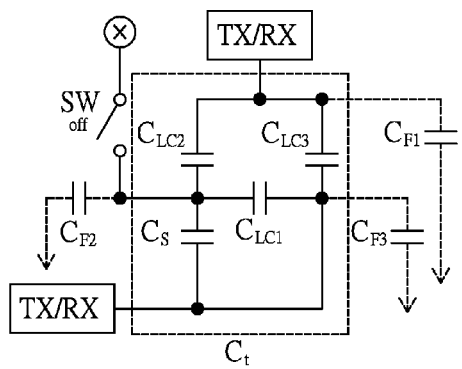
FIG. 4(d)-4(e) illustrate two embodiments of a mutual-capacitor touch detection mode of the architecture of FIG. 4(a).

FIG. 4(d) illustrates an embodiment of the mutual-capacitor touch detection mode of the architecture of FIG. 4(a). In a capacitor network illustrated in FIG. 4(d), $C_S$ is a capacitor defined by the storage capacitor bottom electrode 222 and the storage capacitor top electrode 245, $C_{LC1}$ is a capacitor defined by the counter electrode 221 and the pixel electrode 242, $C_{LC2}$ is a capacitor defined by the pixel electrode 242 and the protection electrode 260, $C_{LC3}$ is a capacitor defined by the counter electrode 221 and the protection electrode 260, $C_t$ is an effective capacitor formed by $C_S$, $C_{LC1}$, $C_{LC2}$, and $C_{LC3}$, $C_{F1}$ is a capacitor induced when a finger is approaching the protection electrode 260, $C_{F2}$ is a capacitor induced when a finger is approaching the pixel electrode 242, and $C_{F3}$ is a capacitor induced when a finger is approaching the counter electrode 221. The touch control unit 281 uses the storage capacitor connection line 223 as a signal transmitting end TX and uses the protection electrode connection line 261 as a signal receiving end RX, or uses the protection electrode connection line 261 as a signal transmitting end TX and uses the storage capacitor connection line 223 as a signal receiving end RX, to detect touch events.

Figure 4E:
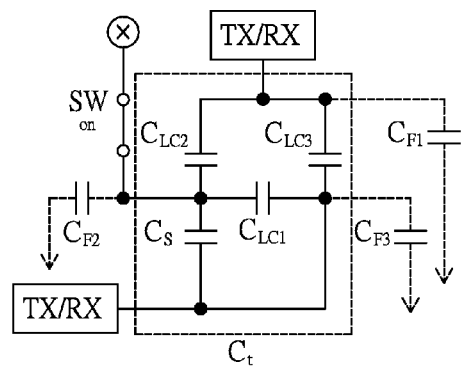

FIG. 4(e) illustrates another embodiment of the mutual-capacitor touch detection mode of the architecture of FIG. 4(a). In a capacitor network illustrated in FIG. 4(e), $C_S$ is a capacitor defined by the storage capacitor bottom electrode 222 and the storage capacitor top electrode 245, $C_{LC1}$ is a capacitor defined by the counter electrode 221 and the pixel electrode 242, $C_{LC2}$ is a capacitor defined by the pixel electrode 242 and the protection electrode 260, $C_{LC3}$ is a capacitor defined by the counter electrode 221 and the protection electrode 260, $C_t$ is an effective capacitor formed by $C_S$, $C_{LC1}$, $C_{LC2}$, and $C_{LC3}$, $C_{F1}$ is a capacitor induced when a finger is approaching the protection electrode 260, $C_{F2}$ is a capacitor induced when a finger is approaching the pixel electrode 242, and $C_{F3}$ is a capacitor induced when a finger is approaching the counter electrode 221. The touch control unit 281 uses the storage capacitor connection line 223 as a signal transmitting end TX and uses the protection electrode connection line 261 or the source connection line 243 as a signal receiving end RX; or uses the protection electrode connection line 261 as a signal transmitting end TX and uses the storage capacitor connection line 223 or the source connection line 243 as a signal receiving end RX; or uses the source connection line 243 as a signal transmitting end TX and uses the storage capacitor connection line 223 or the protection electrode connection line 261 as a signal receiving end RX, to detect touch events.

Figure 5:
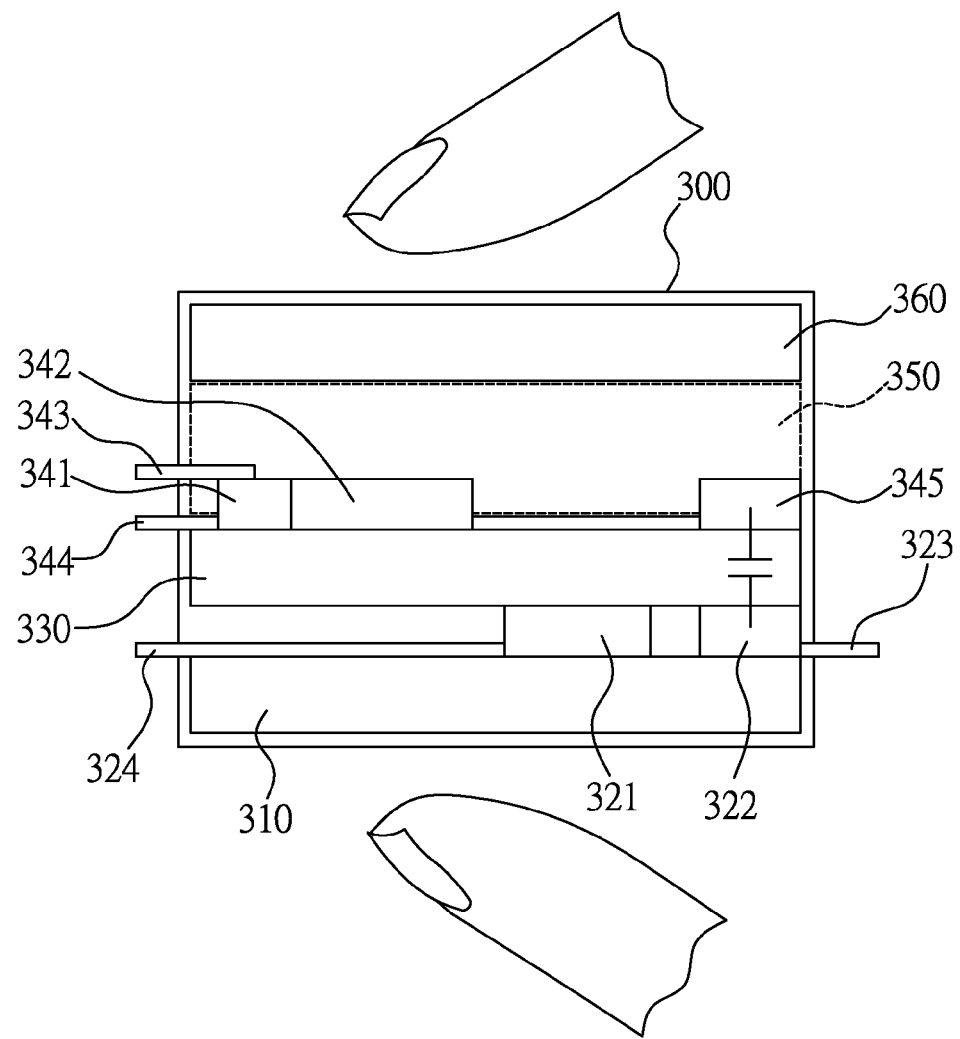
FIG. 5 illustrates the structure of another embodiment of the pixel cell of the present invention.

Please refer to FIG. 5, which illustrates the structure of another embodiment of the pixel cell of the present invention. As illustrated in FIG. 5, a pixel cell 300 includes a first substrate 310, a counter electrode 321, a storage capacitor bottom electrode 322, a storage capacitor connection line 323, a counter electrode connection line 324, an insulation layer 330, a thin film transistor 341, a pixel electrode 342, a source connection line 343, a gate connection line 344, a storage capacitor top electrode 345, a liquid crystal layer 350, and a second substrate 360.

The first substrate 310 is preferably a glass substrate for providing a first touch plane.

The counter electrode 321 is located on the first substrate 310, and can be, for example but not limited to, an ITO electrode, a nano-carbon electrode, or a nano-silver electrode.

The storage capacitor bottom electrode 322 is located on the first substrate 310 and separated from the counter electrode 321, and can be, for example but not limited to, an ITO electrode, a nano-carbon electrode, or a nano-silver electrode.

The storage capacitor connection line 323 can be made of, for example but not limited to, metal, and is coupled electrically with the storage capacitor bottom electrode 322.

The counter electrode connection line 324 can be made of, for example but not limited to, metal, and is coupled electrically with the counter electrode 321.

The insulation layer 330 is made of a transparent dielectric material, and located on the counter electrode 321 and on the storage capacitor bottom electrode 322.

The thin film transistor 341 is located on the insulation layer 330 and has a source, a gate, and a drain.

The pixel electrode 342, preferably an ITO electrode, is located on the insulation layer 330 and coupled electrically with the drain, and is not facing the counter electrode 321.

The source connection line 343 can be made of, for example but not limited to, metal, and is coupled electrically with the source.

The gate connection line 344 can be made of, for example but not limited to, metal, and is coupled electrically with the gate.

The storage capacitor top electrode 345 is located on the insulation layer 330 and coupled electrically with the pixel electrode 342, and can be, for example but not limited to, an ITO electrode, a nano-carbon electrode, or a nano-silver electrode.

The liquid crystal layer 350 is located on the thin film transistor 341, on the pixel electrode 342, and on the storage capacitor top electrode 345.

The second substrate 360 is located on the liquid crystal layer 350, and is preferably a glass substrate for providing a second touch plane, that is, the structure of FIG. 5 can provide dual touch planes.

Figure 6A:
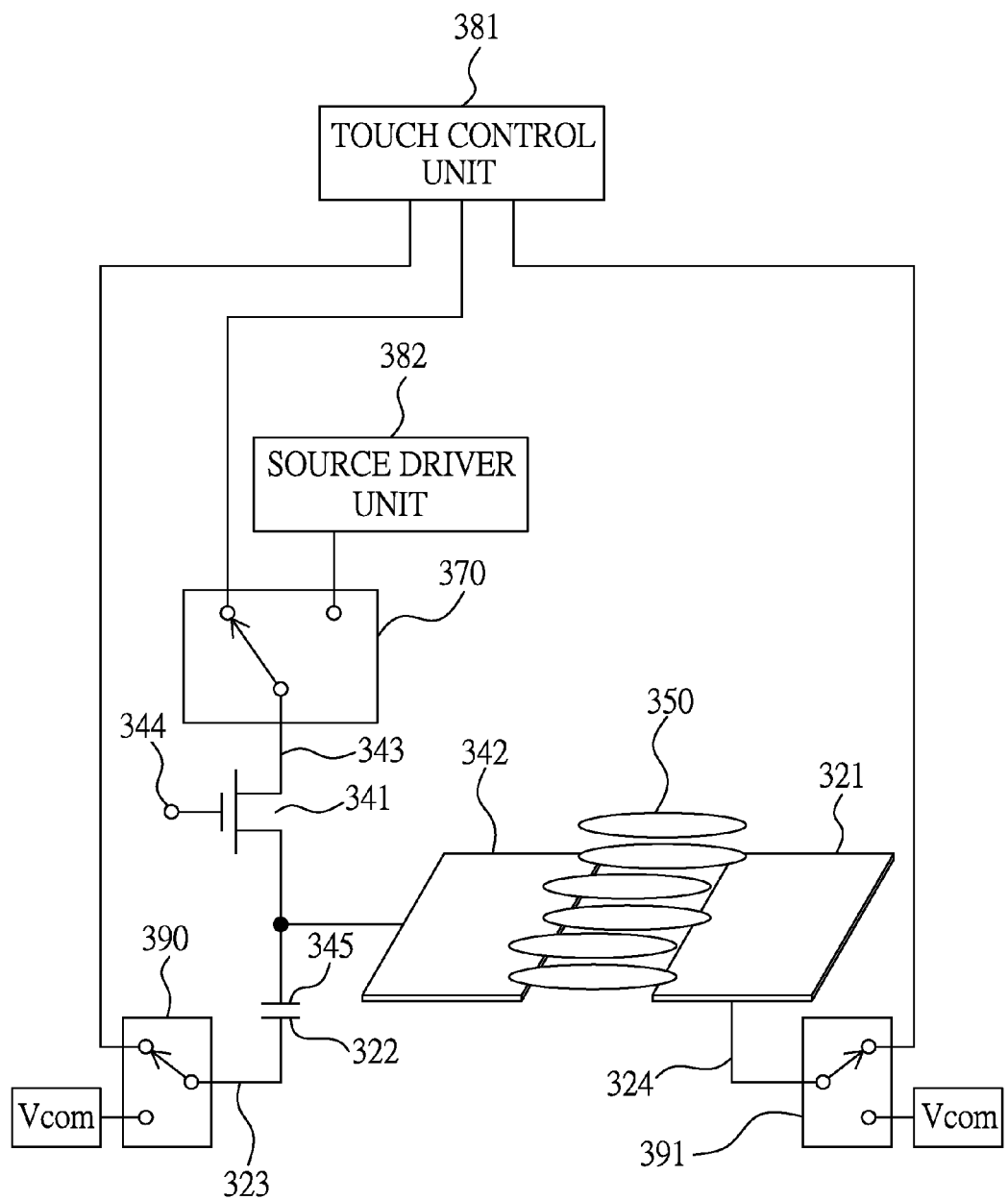
FIG. 6(a) illustrates another embodiment of the touch display having IPS liquid crystal structure of the present invention.

Please refer to FIG. 6(a), which illustrates another embodiment of a touch display having IPS liquid crystal structure of the present invention. As illustrated in FIG. 6(a), the touch display utilizes a multiplexer circuit to cooperate with the pixel cell of FIG. 5 to provide an IPS display function and a touch function. The multiplexer circuit includes a first multiplexer 370, a second multiplexer 390, and a third multiplexer 391.

The first multiplexer 370 has a first contact, a second contact, and a third contact, wherein, the first contact is coupled with the source connection line 343, the second contact is coupled with a source driver unit 382, and the third contact is coupled with a touch control unit 381; and the first contact is coupled electrically with the second contact during a display period, and the first contact is coupled electrically with the third contact during a touch detection period.

The second multiplexer 390 has a fourth contact, a fifth contact, and a sixth contact, wherein, the fourth contact is coupled with the storage capacitor connection line 323, the fifth contact is coupled with a common voltage $V_{com}$, and the sixth contact is coupled with the touch control unit 381; and the fourth contact is coupled electrically with the fifth contact during the display period, and the fourth contact is coupled electrically with the sixth contact during the touch detection period.

The third multiplexer 391 has a seventh contact, an eighth contact, and a ninth contact, wherein, the seventh contact is coupled with the counter electrode connection line 324, the eighth contact is coupled with the common voltage $V_{com}$, and the ninth contact is coupled with the touch control unit 381; and the seventh contact is coupled electrically with the eighth contact during the display period, and the seventh contact is coupled electrically with the ninth contact during the touch detection period.

Figure 6D:
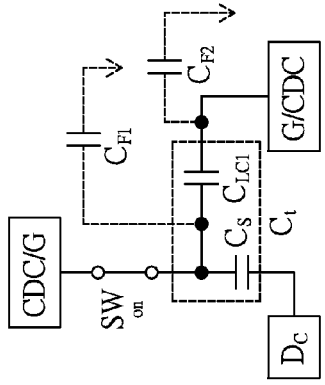
FIG. 6(b)-6(d) illustrate three embodiments of a self-capacitor touch detection mode of the architecture of FIG. 6(a).
Figure 6G:
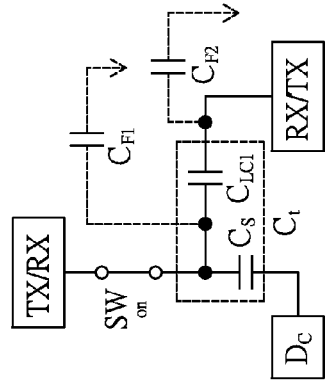
FIG. 6(e)-6(g) illustrate three embodiments of a mutual-capacitor touch detection mode of the architecture of FIG. 6(a).

The architecture of FIG. 6(a) can provide a self-capacitor touch detection mode and a mutual-capacitor touch detection mode. Please refer to FIG. 6(b), which illustrates an embodiment of the self-capacitor touch detection mode of the architecture of FIG. 6(a). In a capacitor network illustrated in FIG. 6(b), $C_S$ is a capacitor defined by the storage capacitor bottom electrode 322 and the storage capacitor top electrode 345, $C_{LC1}$ is a capacitor defined by the counter electrode 321 and the pixel electrode 342, $C_t$ is an effective capacitor formed by $C_S$, and $C_{LC1}$, $C_{F1}$ is a capacitor induced when a finger is approaching the pixel electrode 342, and $C_{F2}$ is a capacitor induced when a finger is approaching the counter electrode 321. The touch control unit 381 performs a CDC operation on the capacitor network via the storage capacitor connection line 323 or via the counter electrode connection line 324, to detect touch events.

Figure 6C:
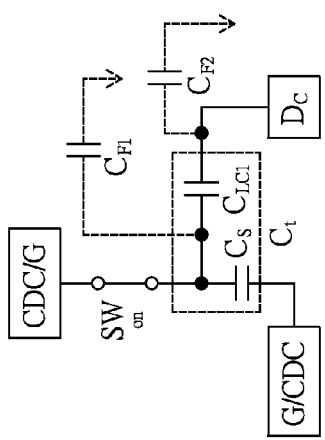

FIG. 6(c) illustrates another embodiment of the self-capacitor touch detection mode of the architecture of FIG. 6(a). In a capacitor network illustrated in FIG. 6(c), $C_S$ is a capacitor defined by the storage capacitor bottom electrode 322 and the storage capacitor top electrode 345, $C_{LC1}$ is a capacitor defined by the counter electrode 321 and the pixel electrode 342, $C_t$ is an effective capacitor formed by $C_S$, and $C_{LC1}$, $C_{F1}$ is a capacitor induced when a finger is approaching the pixel electrode 342, and $C_{F2}$ is a capacitor induced when a finger is approaching the counter electrode 321. The touch control unit 381 couples a DC voltage to the counter electrode connection line 324 and performs a CDC operation on the capacitor network via the storage capacitor connection line 323 or via the source connection line 343, to detect touch events.

FIG. 6(d) illustrates another embodiment of the self-capacitor touch detection mode of the architecture of FIG. 6(a). In a capacitor network illustrated in FIG. 6(d), $C_S$ is a capacitor defined by the storage capacitor bottom electrode 322 and the storage capacitor top electrode 345, $C_{LC1}$ is a capacitor defined by the counter electrode 321 and the pixel electrode 342, $C_t$ is an effective capacitor formed by $C_S$, and $C_{LC1}$, $C_{F1}$ is a capacitor induced when a finger is approaching the pixel electrode 342, and $C_{F2}$ is a capacitor induced when a finger is approaching the counter electrode 321. The touch control unit 381 couples a DC voltage to the storage capacitor connection line 323 and performs a CDC operation on the capacitor network via the counter electrode connection line 324 or via the source connection line 343, to detect touch events.

Figure 6F:
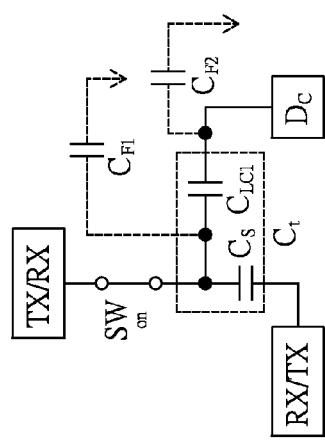
Figure 6B:
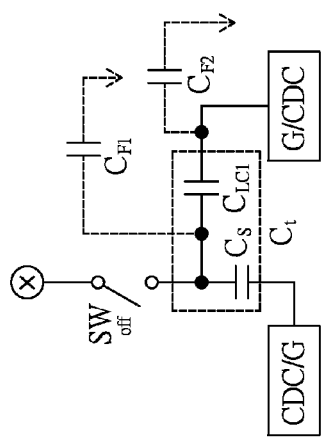
Figure 6E:
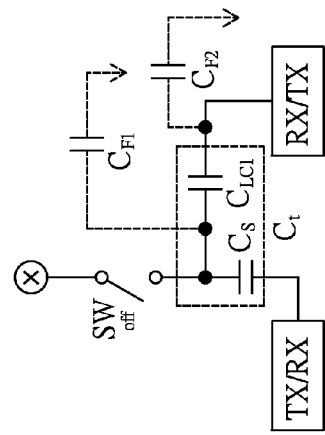

FIG. 6(e) illustrates an embodiment of the mutual-capacitor touch detection mode of the architecture of FIG. 6(a). In a capacitor network illustrated in FIG. 6(e), $C_S$ is a capacitor defined by the storage capacitor bottom electrode 322 and the storage capacitor top electrode 345, $C_{LC1}$ is a capacitor defined by the counter electrode 321 and the pixel electrode 342, $C_t$ is an effective capacitor formed by $C_S$, and $C_{LC1}$, $C_{F1}$ is a capacitor induced when a finger is approaching the pixel electrode 342, $C_{F2}$ is a capacitor induced when a finger is approaching the counter electrode 321. The touch control unit 381 uses the storage capacitor connection line 323 as a signal transmitting end TX and uses the counter electrode connection line 324 as a signal receiving end RX, or uses the counter electrode connection line 324 as a signal transmitting end TX and uses the storage capacitor connection line 323 as a signal receiving end RX, to detect touch events.

FIG. 6(f) illustrates another embodiment of the mutual-capacitor touch detection mode of the architecture of FIG. 6(a). In a capacitor network illustrated in FIG. 6(f), $C_S$ is a capacitor defined by the storage capacitor bottom electrode 322 and the storage capacitor top electrode 345, $C_{LC1}$ is a capacitor defined by the counter electrode 321 and the pixel electrode 342, $C_t$ is an effective capacitor formed by $C_S$, and $C_{LC1}$, $C_{F1}$ is a capacitor induced when a finger is approaching the pixel electrode 342, $C_{F2}$ is a capacitor induced when a finger is approaching the counter electrode 321. The touch control unit 381 couples a DC voltage to the counter electrode connection line 324, uses the storage capacitor connection line 323 as a signal transmitting end TX and uses the source connection line 343 as a signal receiving end RX, or uses the source connection line 343 as a signal transmitting end TX and uses the storage capacitor connection line 323 as a signal receiving end RX, to detect touch events.

In a capacitor network illustrated in FIG. 6(g), $C_S$ is a capacitor defined by the storage capacitor bottom electrode 322 and the storage capacitor top electrode 345, $C_{LC1}$ is a capacitor defined by the counter electrode 321 and the pixel electrode 342, $C_t$ is an effective capacitor formed by $C_S$, and $C_{LC1}$, $C_{F1}$ is a capacitor induced when a finger is approaching the pixel electrode 342, $C_{F2}$ is a capacitor induced when a finger is approaching the counter electrode 321. The touch control unit 381 couples a DC voltage to the storage capacitor connection line 323, uses the counter electrode connection line 324 as a signal transmitting end TX and uses the source connection line 343 as a signal receiving end RX, or uses the source connection line 343 as a signal transmitting end TX and uses the counter electrode connection line 324 as a signal receiving end RX, to detect touch events.

Figure 7:
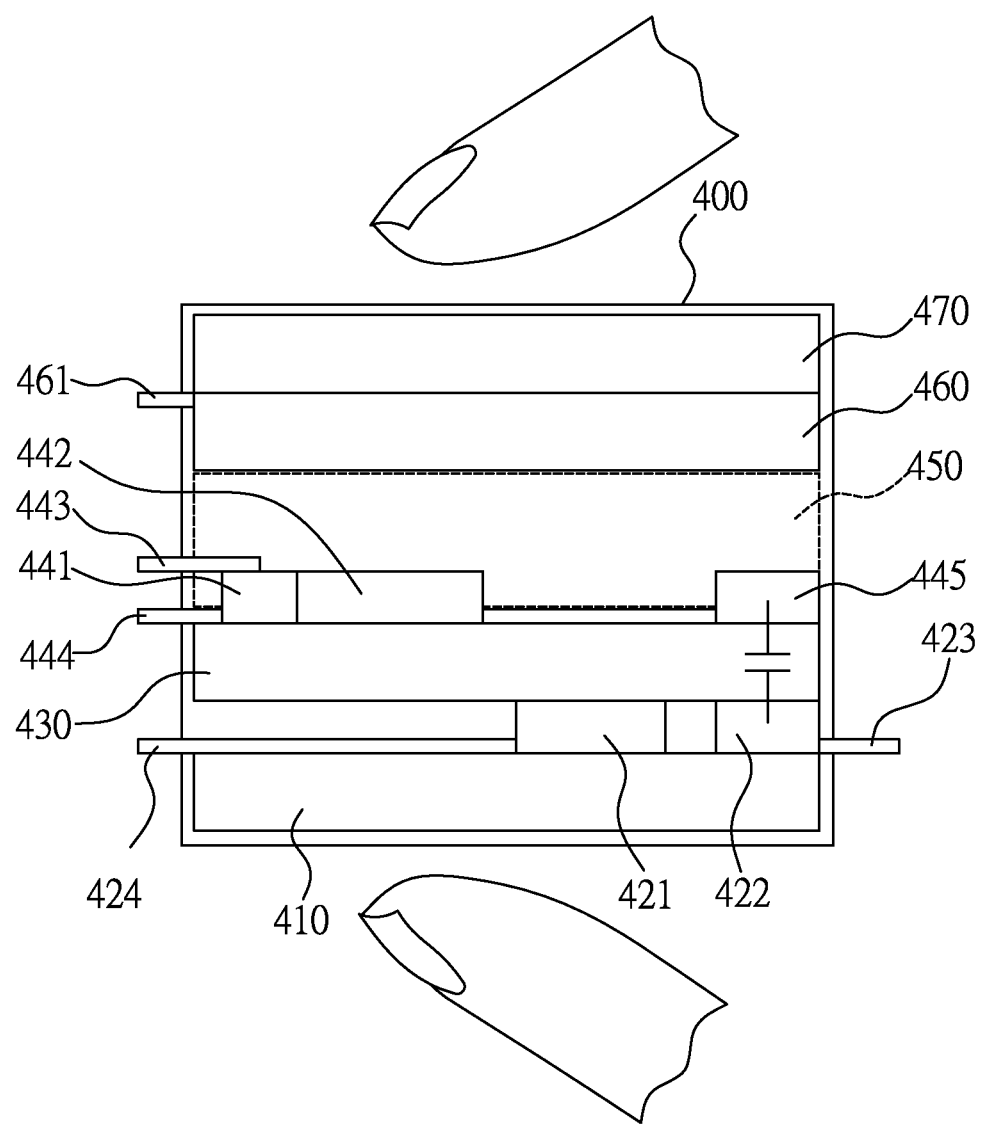
FIG. 7 illustrates the structure of another embodiment of the pixel cell of the present invention.

Please refer to FIG. 7, which illustrates the structure of another embodiment of the pixel cell of the present invention. As illustrated in FIG. 7, a pixel cell 400 includes a first substrate 410, a counter electrode 421, a storage capacitor bottom electrode 422, a storage capacitor connection line 423, a counter electrode connection line 424, an insulation layer 430, a thin film transistor 441, a pixel electrode 442, a source connection line 443, a gate connection line 444, a storage capacitor top electrode 445, a liquid crystal layer 450, a protection electrode 460, a protection electrode connection line 461, and a second substrate 470.

The first substrate 410 is preferably a glass substrate for providing a first touch plane.

The counter electrode 421 is located on the first substrate 410, and can be for example but not limited to an ITO electrode, a nano-carbon electrode, or a nano-silver electrode.

The storage capacitor bottom electrode 422 is located on the first substrate 410 and separated from the counter electrode 421, and can be for example but not limited to an ITO electrode, a nano-carbon electrode, or a nano-silver electrode.

The storage capacitor connection line 423 can be made of, for example but not limited to, metal, and is coupled electrically with the storage capacitor bottom electrode 422.

The counter electrode connection line 424 can be made of, for example but not limited to, metal, and is coupled electrically with the counter electrode 421.

The insulation layer 430 is made of a transparent dielectric material, and located on the counter electrode 421 and on the storage capacitor bottom electrode 422.

The thin film transistor 441 is located on the insulation layer 430 and has a source, a gate, and a drain.

The pixel electrode 442, preferably an ITO electrode, is located on the insulation layer 430 and coupled electrically with the drain, and is not facing the counter electrode 421.

The source connection line 443 can be made of, for example but not limited to, metal, and is coupled electrically with the source.

The gate connection line 444 can be made of, for example but not limited to, metal, and is coupled electrically with the gate.

The storage capacitor top electrode 445 is located on the insulation layer 430 and coupled electrically with the pixel electrode 442, and can be an ITO electrode, a nano-carbon electrode, or a nano-silver electrode.

The liquid crystal layer 450 is located on the thin film transistor 441, on the pixel electrode 442, and on the storage capacitor top electrode 445.

The protection electrode 460 is located on the liquid crystal layer 450, and is a transparent electrode, which can be implemented by ITO.

The protection electrode connection line 461 can be made of, for example but not limited to, metal, and is coupled electrically with the protection electrode 460.

The second substrate 470 is located on the protection electrode 460, and is preferably a glass substrate for providing a second touch plane, that is, the structure of FIG. 7 can provide dual touch planes.

Figure 8A:
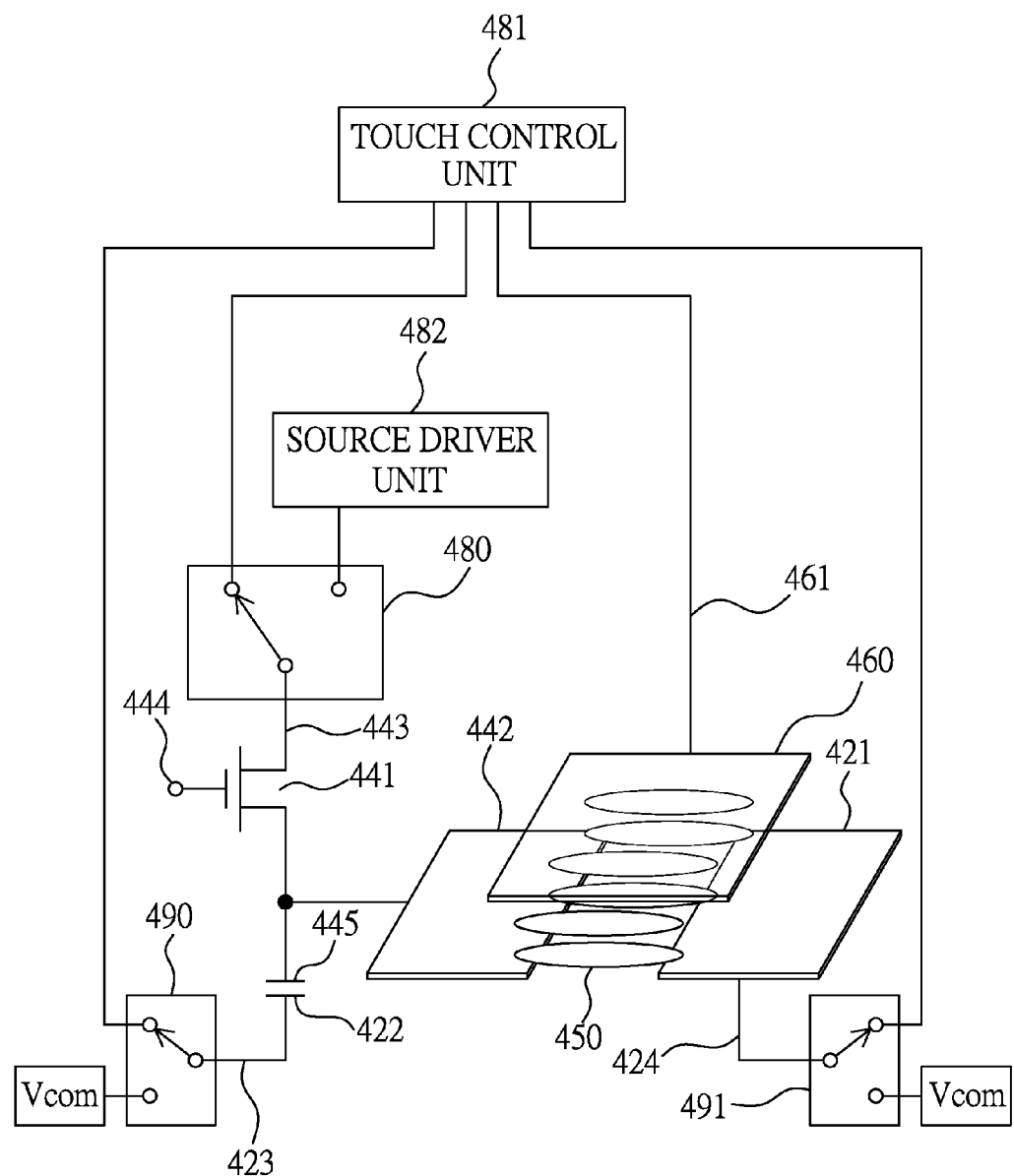
FIG. 8(a) illustrates another embodiment of the touch display having IPS liquid crystal structure of the present invention.

Please refer to FIG. 8(a), which illustrates another embodiment of a touch display having IPS liquid crystal structure of the present invention. As illustrated in FIG. 8(a), the touch display utilizes a multiplexer circuit to cooperate with the pixel cell of FIG. 7 to provide an IPS display function and a touch function. The multiplexer circuit includes a first multiplexer 480, a second multiplexer 490, and a third multiplexer 491.

The first multiplexer 480 has a first contact, a second contact, and a third contact, wherein, the first contact is coupled with the source connection line 443, the second contact is coupled with a source driver unit 482, and the third contact is coupled with a touch control unit 481; and the first contact is coupled electrically with the second contact during a display period, and the first contact is coupled electrically with the third contact during a touch detection period.

The second multiplexer 490 has a fourth contact, a fifth contact, and a sixth contact, wherein, the fourth contact is coupled with the storage capacitor connection line 423, the fifth contact is coupled with a common voltage $V_{com}$, and the sixth contact is coupled with the touch control unit 481; and the fourth contact is coupled electrically with the fifth contact during the display period, and the fourth contact is coupled electrically with the sixth contact during the touch detection period.

The third multiplexer 491 has a seventh contact, an eighth contact, and a ninth contact, wherein, the seventh contact is coupled with the counter electrode connection line 424, the eighth contact is coupled with the common voltage $V_{com}$, and the ninth contact is coupled with the touch control unit 481; and the seventh contact is coupled electrically with the eighth contact during the display period, and the seventh contact is coupled electrically with the ninth contact during the touch detection period.

Besides, the protection electrode connection line 461 is coupled with the touch control unit 481 to provide both an ESD (electrostatic discharge) path and a touch detection path.

The architecture of FIG. 8(a) can provide a self-capacitor touch detection mode and a mutual-capacitor touch detection mode. Please refer to FIG. 8(b), which illustrates an embodiment of the self-capacitor touch detection mode of the architecture of FIG. 8(a). As illustrated in a capacitor network of FIG. 8(b), $C_S$ is a capacitor defined by the storage capacitor bottom electrode 422 and the storage capacitor top electrode 445, $C_{LC1}$ is a capacitor defined by the counter electrode 421 and the pixel electrode 442, $C_{LC2}$ is a capacitor defined by the pixel electrode 442 and the protection electrode 460, $C_{LC3}$ is a capacitor defined by the counter electrode 421 and the protection electrode 460, $C_t$ is an effective capacitor formed by $C_S$, $C_{LC1}$, $C_{LC2}$, and $C_{LC3}$, $C_{F1}$ is a capacitor induced when a finger is approaching the protection electrode 460, $C_{F2}$ is a capacitor induced when a finger is approaching the counter electrode 421, and $C_{F3}$ is a capacitor induced when a finger is approaching the pixel electrode 442. The touch unit 481 performs a CDC operation on the capacitor network via the storage capacitor connection line 423 or via the counter electrode connection line 424 or via the protection electrode connection line 461, to detect touch events.

Figure 8B:
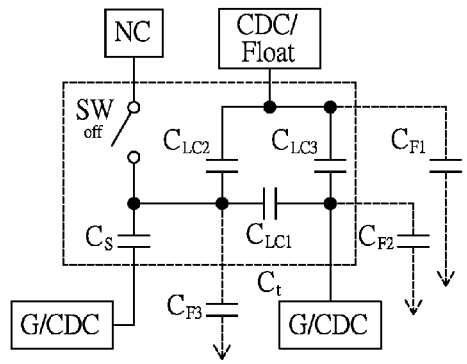
FIG. 8(b)-8(e) illustrate four embodiments of a self-capacitor touch detection mode of the architecture of FIG. 8(a).

In addition, by coupling a specific connection line (or lines) to ground, a specific capacitor (or capacitors) can be disabled, and the capacitor network of FIG. 8(b) can therefore be simplified. For related embodiments, please refer to FIG. 8(c)-8(e).

Figure 8C:
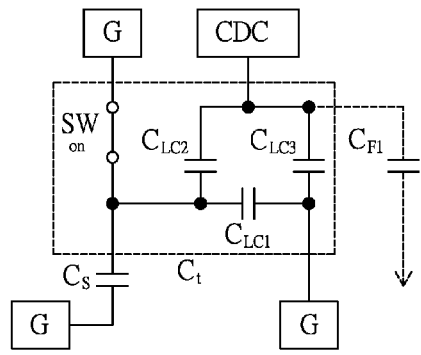

FIG. 8(c) illustrates another embodiment of the self-capacitor touch detection mode of the architecture of FIG. 8(a). In FIG. 8(c), the touch control unit 481 couples the source connection line 443, the storage capacitor connection line 423, and the counter electrode connection line 424 to ground to disable $C_S$, $C_{LC1}$, $C_{F2}$, and $C_{F3}$, and performs a CDC operation on the capacitor network via the protection electrode connection line 461 to detect touch events.

Figure 8D:
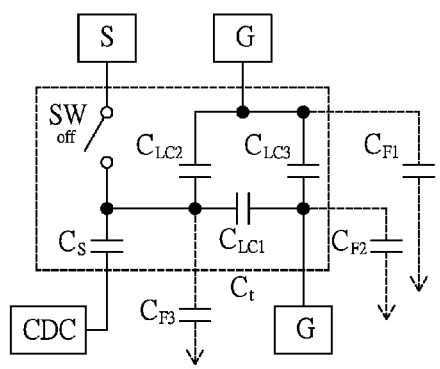

FIG. 8(d) illustrates another embodiment of the self-capacitor touch detection mode of the architecture of FIG. 8(a). In FIG. 8(d), the touch control unit 481 couples the counter electrode connection line 424 and the protection electrode connection line 461 to ground to disable $C_{LC3}$, $C_{F1}$, and $C_{F2}$, and performs a CDC operation on the capacitor network via the storage capacitor connection line 423 to detect touch events.

Figure 8E:
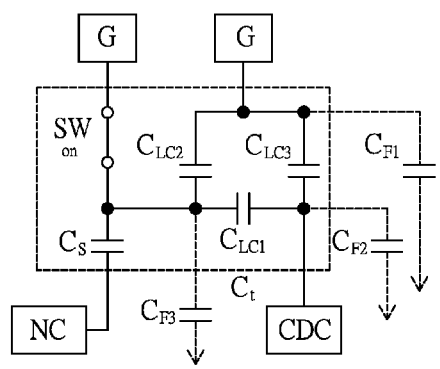

FIG. 8(e) illustrates another embodiment of the self-capacitor touch detection mode of the architecture of FIG. 8(a). In FIG. 8(e), the touch control unit 481 couples the source connection line 443 and the protection electrode connection line 461 to ground to disable $C_{LC2}$, $C_{F1}$, and $C_{F3}$, and performs a CDC operation on the capacitor network via the counter electrode connection line 424 to detect touch events.

Figure 8F:
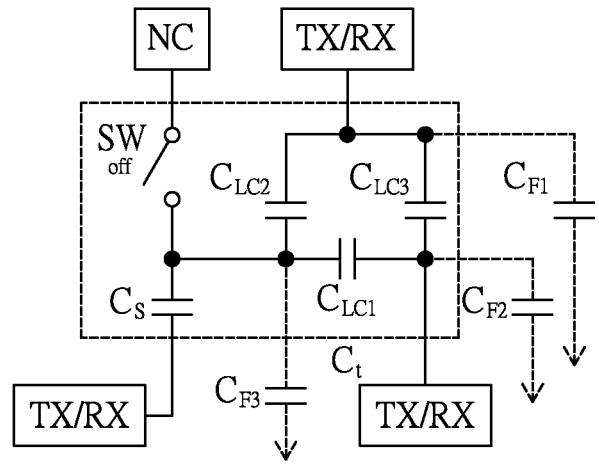
FIG. 8(f)-8(g) illustrate two embodiments of a mutual-capacitor touch detection mode of the architecture of FIG. 8(a).

FIG. 8(f) illustrates an embodiment of the mutual-capacitor touch detection mode of the architecture of FIG. 8(a). As illustrated in a capacitor network of FIG. 8(f), $C_S$ is a capacitor defined by the storage capacitor bottom electrode 422 and the storage capacitor top electrode 445, $C_{LC1}$ is a capacitor defined by the counter electrode 421 and the pixel electrode 442, $C_{LC2}$ is a capacitor defined by the pixel electrode 442 and the protection electrode 460, $C_{LC3}$ is a capacitor defined by the counter electrode 421 and the protection electrode 460, $C_t$ is an effective capacitor formed by $C_S$, $C_{LC1}$, $C_{LC2}$, and $C_{LC3}$, $C_{F1}$ is a capacitor induced when a finger is approaching the protection electrode 460, $C_{F2}$ is a capacitor induced when a finger is approaching the counter electrode 421, and $C_{F3}$ is a capacitor induced when a finger is approaching the pixel electrode 442. The touch control unit 481 uses the storage capacitor connection line 423 as a signal transmitting end TX and uses the protection electrode connection line 461 or the counter electrode connection line 424 as a signal receiving end RX; or uses the counter electrode connection line 424 as a signal transmitting end TX and uses the storage capacitor connection line 423 or the protection electrode connection line 461 as a signal receiving end RX; or uses the protection electrode connection line 461 as a signal transmitting end TX and uses the storage capacitor connection line 423 or the counter electrode connection line 424 as a signal receiving end RX, to detect touch events.

Figure 8G:
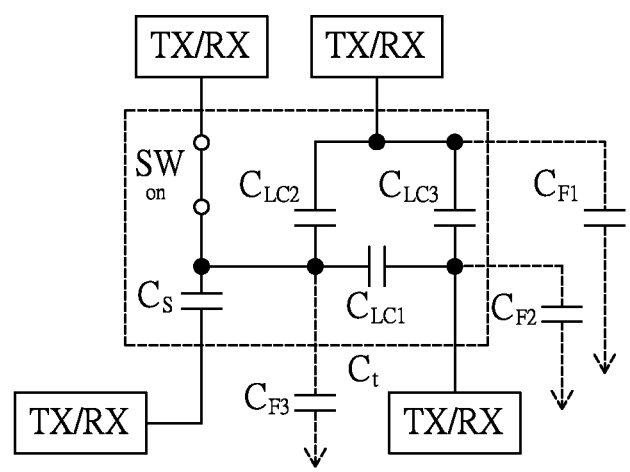

FIG. 8(g) illustrates another embodiment of the mutual-capacitor touch detection mode of the architecture of FIG. 8(a). As illustrated in a capacitor network of FIG. 8(g), $C_S$ is a capacitor defined by the storage capacitor bottom electrode 422 and the storage capacitor top electrode 445, $C_{LC1}$ is a capacitor defined by the counter electrode 421 and the pixel electrode 442, $C_{LC2}$ is a capacitor defined by the pixel electrode 442 and the protection electrode 460, $C_{LC3}$ is a capacitor defined by the counter electrode 421 and the protection electrode 460, $C_t$ is an effective capacitor formed by $C_S$, $C_{LC1}$, $C_{LC2}$, and $C_{LC3}$, $C_{F1}$ is a capacitor induced when a finger is approaching the protection electrode 460, $C_{F2}$ is a capacitor induced when a finger is approaching the counter electrode 421, and $C_{F3}$ is a capacitor induced when a finger is approaching the pixel electrode 442. The touch control unit 481 uses the storage capacitor connection line 423 as a signal transmitting end TX and uses the protection electrode connection line 461 or the source connection line 443 or the counter electrode connection line 424 as a signal receiving end RX; or uses the counter electrode connection line 424 as a signal transmitting end TX and uses the storage capacitor connection line 423 or the source connection line 443 or the protection electrode connection line 461 as a signal receiving end RX; or uses the protection electrode connection line 461 as a signal transmitting end TX and uses the source connection line 443 or the storage capacitor connection line 423 or the counter electrode connection line 424 as a signal receiving end RX; or uses the source connection line 443 as a signal transmitting end TX and uses the storage capacitor connection line 423 or the counter electrode connection line 424 or the protection electrode connection line 461 as a signal receiving end RX, to detect touch events.

Figure 9A:
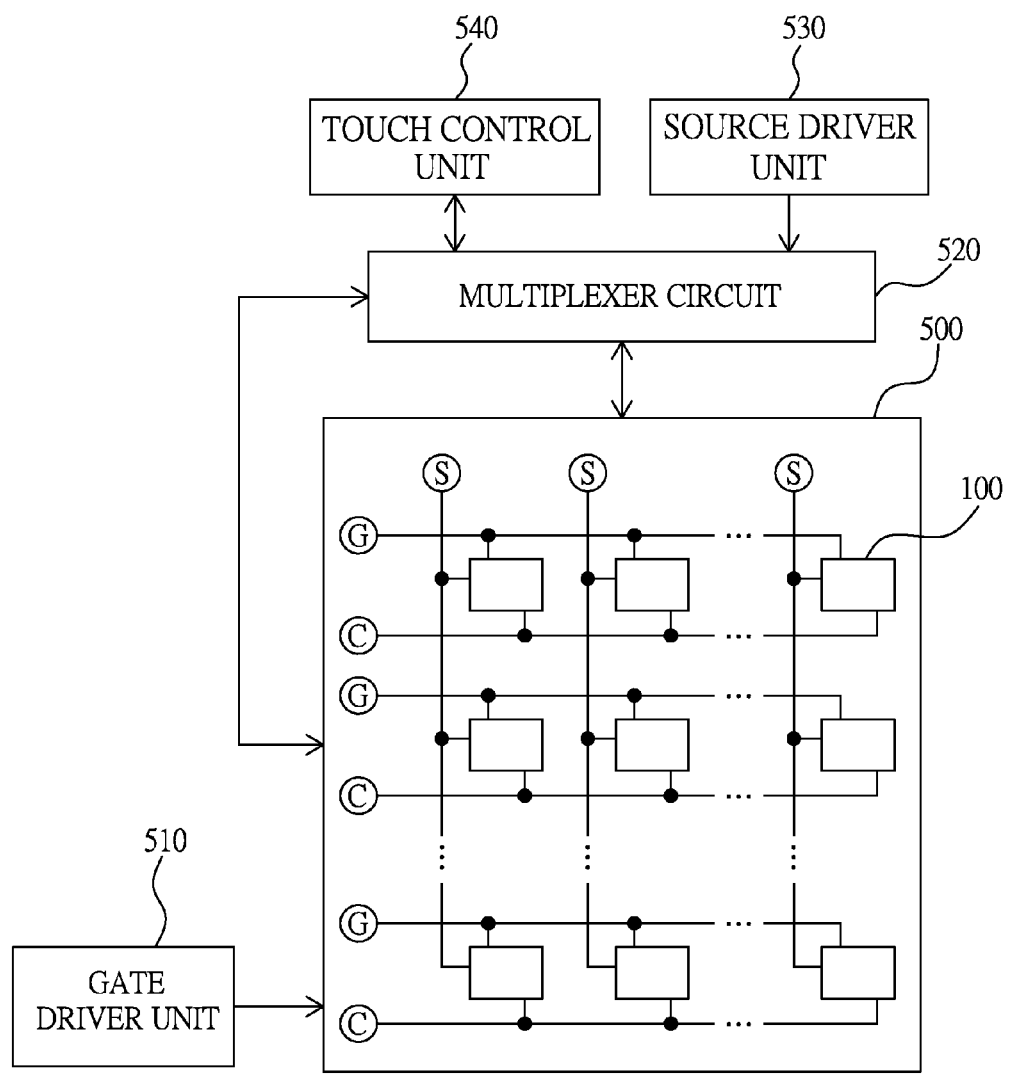
FIG. 9(a) illustrates another embodiment of the touch display having IPS liquid crystal structure of the present invention.

Please refer to FIG. 9(a), which illustrates another embodiment of the touch display having IPS liquid crystal structure of the present invention. As illustrated in FIG. 9(a), the touch display has a pixel array 500, a gate driver unit 510, a multiplexer circuit 520, a source driver unit 530, and a touch control unit 540.

The pixel array 500 has plural external source connection lines S, plural external gate connection lines G, plural external storage capacitor connection lines C, and plural pixel cells 100, wherein each of the plural pixel cells 100 (please refer to FIG. 1) includes: a first substrate 110; a counter electrode 121 located on the first substrate 110; a storage capacitor bottom electrode 122 located on the first substrate 110 and coupled electrically with the counter electrode 121; a storage capacitor connection line 123 coupled electrically with the counter electrode 121, with the storage capacitor bottom electrode 122, and with one of the plural external storage capacitor connection lines C; an insulation layer 130 located on the counter electrode 121 and on the storage capacitor bottom electrode 122; a thin film transistor 141 located on the insulation layer 130 and having a gate, a source, and a drain; a pixel electrode 142 located on the insulation layer 130 and coupled electrically with the drain; a storage capacitor top electrode 145 located on the insulation layer 130 and coupled electrically with the pixel electrode 142; a gate connection line 144 coupled electrically with the gate and with one of the plural external gate connection lines G; a source connection line 143 coupled electrically with the source and with one of the plural external source connection lines S; a liquid crystal layer 150 located on the thin film transistor 141, on the pixel electrode 142, and on the storage capacitor top electrode 145; and a second substrate 160 located on the liquid crystal layer 150.

The gate driver unit 510 is coupled with the plural external gate connection lines G.

The multiplexer circuit 520 is coupled with the plural external source connection lines S and with the plural external storage capacitor connection lines C.

The source driver unit 530 is coupled with the multiplexer circuit 520.

The touch control unit 540 is coupled with the multiplexer circuit 520.

When in operation, the multiplexer circuit 520 will couple the source driver unit 530 with the plural external source connection lines S and with the plural external storage capacitor connection lines C during a display period, and couple the touch control unit 540 with the plural external source connection lines S and with the plural external storage capacitor connection lines C during a touch detection period; and the touch control unit 540 will perform a touch detection procedure during the touch detection period, the touch detection procedure being selected from a group consisting of a self-capacitor touch detection procedure, a mutual-capacitor touch detection procedure, and any combination thereof.

Figure 9B:
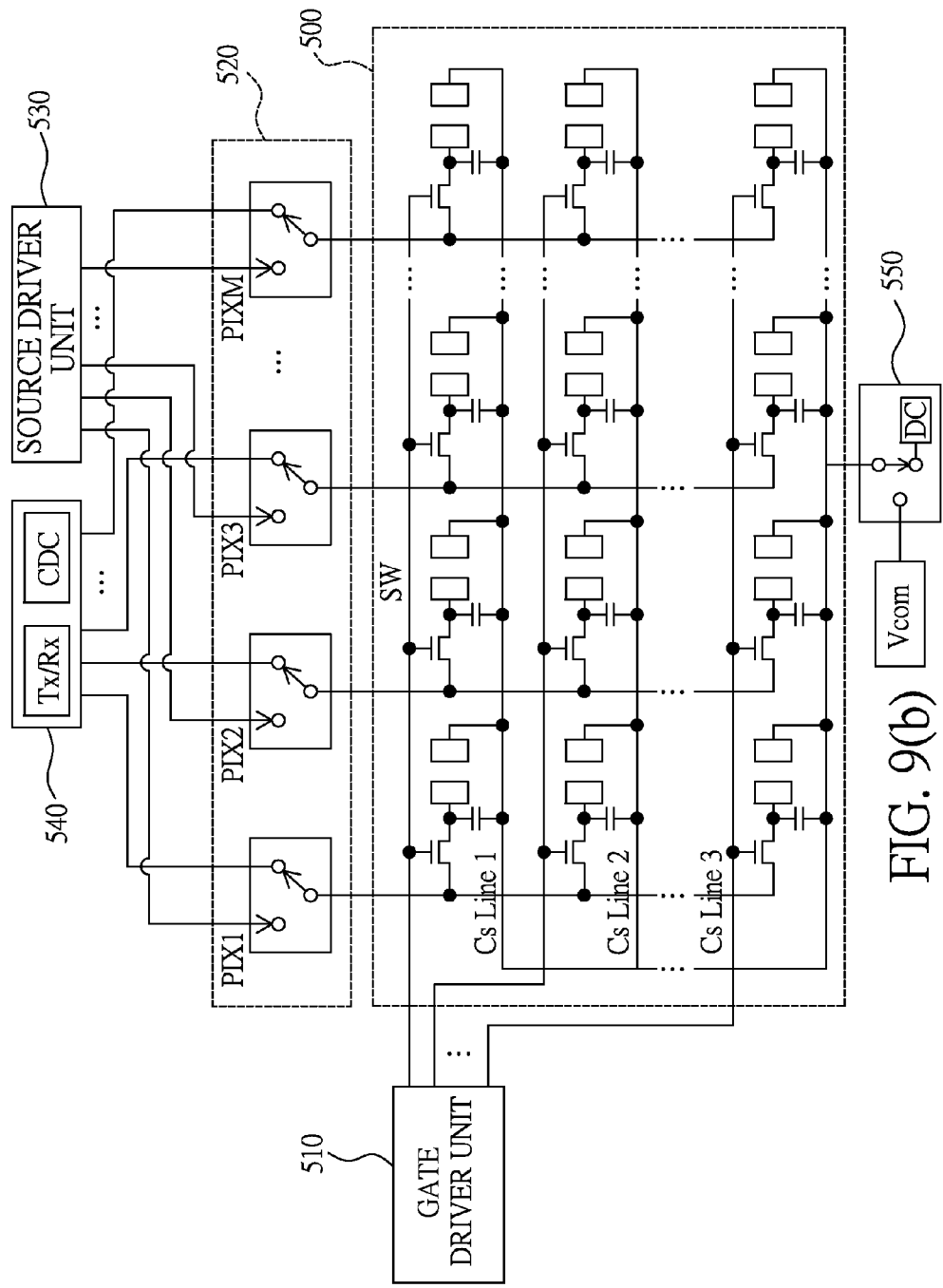
FIG. 9(b) illustrates a detailed diagram of FIG. 9(a).

FIG. 9(b) illustrates a detailed diagram of FIG. 9(a), in which a bias voltage selectable circuit 550 is used to disable specific capacitors. Take the storage capacitor as an example. When the bias voltage selectable circuit 550 provides a voltage for the pixel array 500 equal to a voltage provided by the touch control unit 540 for the pixel array 500, there will be no current flowing in the storage capacitors, that is, the storage capacitors will be disabled. As the capacitance induced by a finger in a touch operation is not large, therefore, when the internal capacitance of the pixel array 500 is reduced, the reliability of touch detection will be substantially enhanced.

Figure 10:
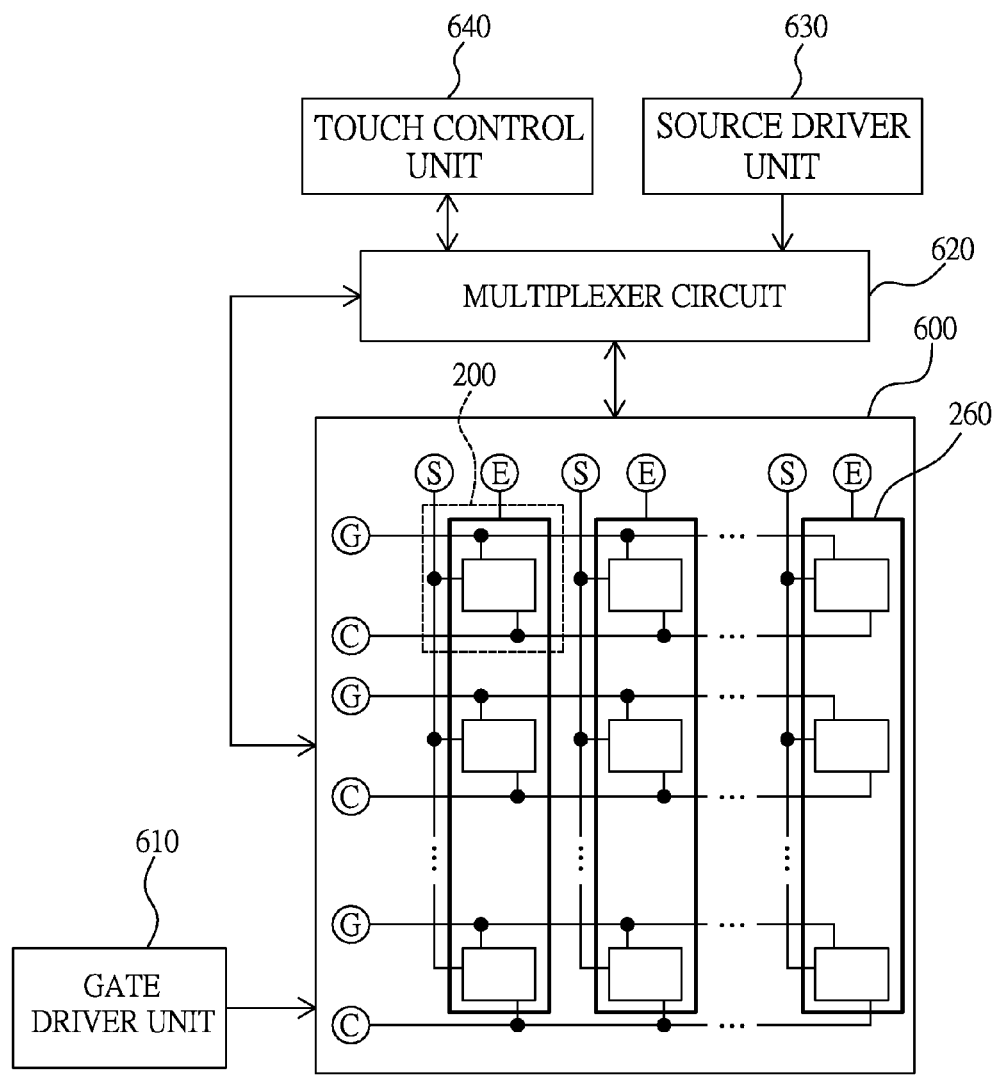
FIG. 10 illustrates another embodiment of the touch display having IPS liquid crystal structure of the present invention.
Figure 11:
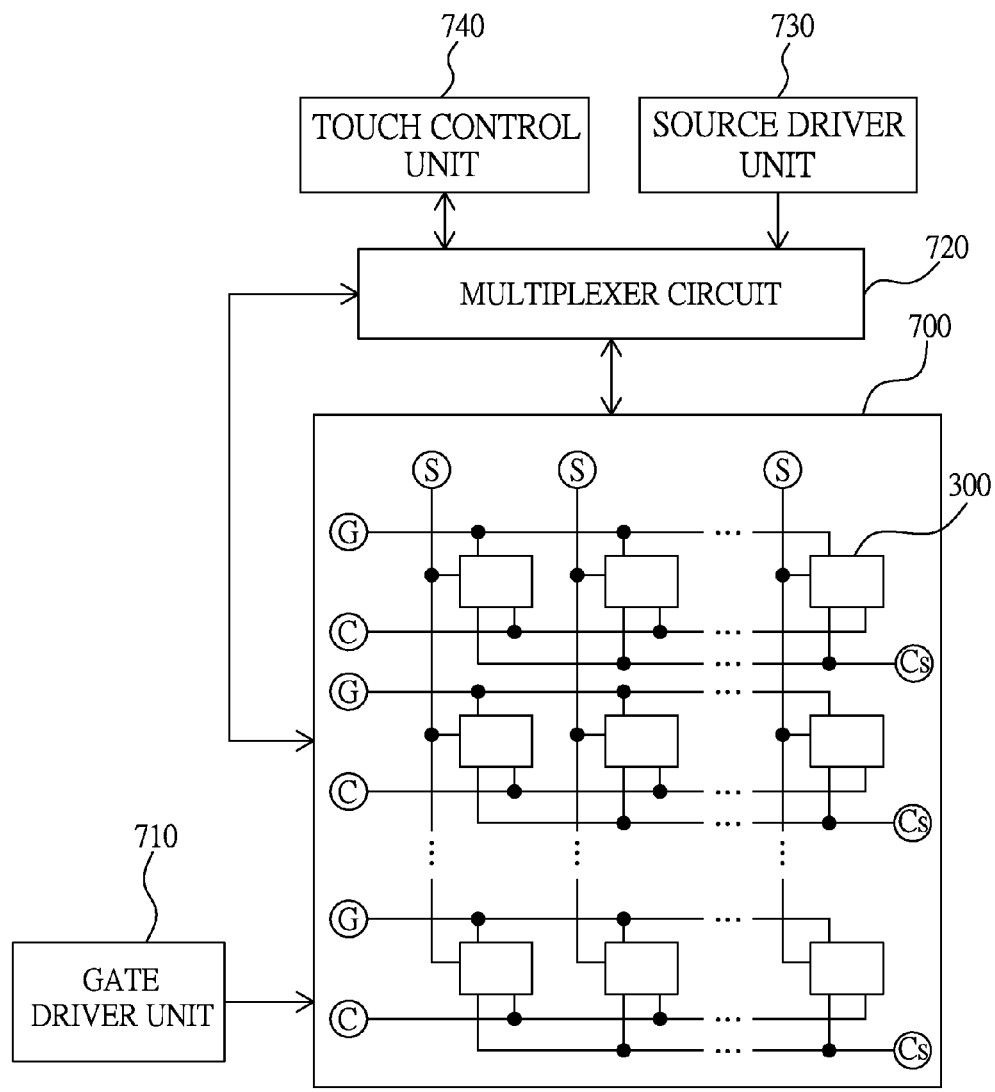
FIG. 11 illustrates another embodiment of the touch display having IPS liquid crystal structure of the present invention.
Figure 12:
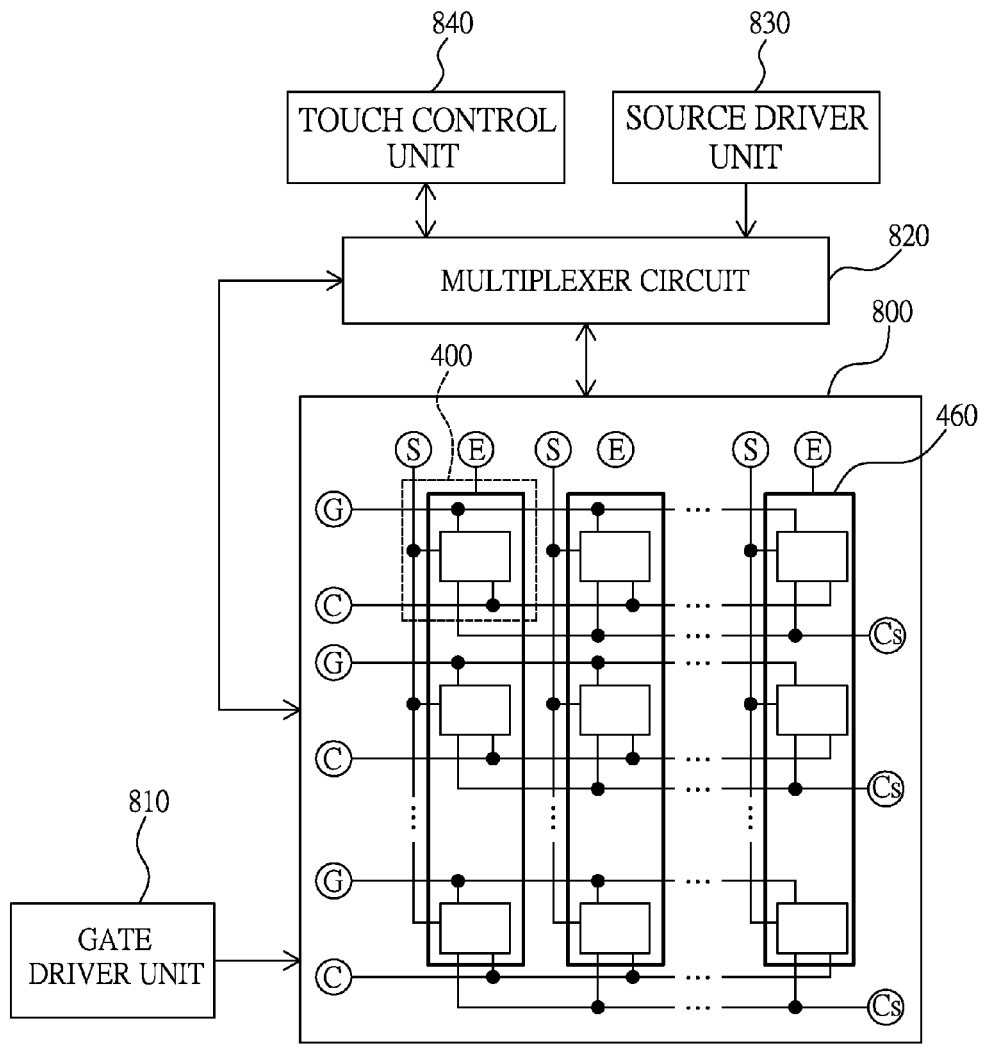
FIG. 12 illustrates still another embodiment of the touch display having IPS liquid crystal structure of the present invention.

Based on the touch detection principles disclosed in FIG. 9(*a*) and FIG. 9(*b*) (including the bias voltage technique for reducing the internal capacitance of the pixel array), the present invention further proposes other embodiments, which will be specified with reference to FIG. 10-12.

Please refer to FIG. 10, which illustrates another embodiment of the touch display having IPS liquid crystal structure of the present invention. As illustrated in FIG. 10, the touch display has a pixel array 600, a gate driver unit 610, a multiplexer circuit 620, a source driver unit 630, and a touch control unit 640.

The pixel array 600 has plural external source connection lines S, plural external gate connection lines G, plural external storage capacitor connection lines C, plural external protection electrode connection lines E, and plural pixel cells 200, wherein each of the plural pixel cells 200 (please refer to FIG. 3) includes: a first substrate 210; a counter electrode 221 located on the first substrate 210; a storage capacitor bottom electrode 222 located on the first substrate 210 and coupled electrically with the counter electrode 221; a storage capacitor connection line 223 coupled electrically with the counter electrode 221, with the storage capacitor bottom electrode 222, and with one of the plural external storage capacitor connection lines C; an insulation layer 230 located on the counter electrode 221 and on the storage capacitor bottom electrode 222; a thin film transistor 241 located on the insulation layer 230 and having a gate, a source, and a drain; a pixel electrode 242 located on the insulation layer 230 and coupled electrically with the drain; a storage capacitor top electrode 245 located on the insulation layer 230 and coupled electrically with the pixel electrode 242; a gate connection line 244 coupled electrically with the gate and with one of the plural external gate connection lines G; a source connection line 243 coupled electrically with the source and with one of the plural external source connection lines S; a liquid crystal layer 250 located on the thin film transistor 241, on the pixel electrode 242, and on the storage capacitor top electrode 245; a protection electrode 260 located on the liquid crystal layer 250; a protection electrode connection line 261 coupled electrically with the protection electrode 260 and with one of the plural external protection electrode connection lines E; and a second substrate 270 located on the protection electrode 260. Besides, the protection electrodes 260 can be aligned in rows or columns or in any skewed direction, and can be shaped as long rectangles, triangles, or any other shape.

The gate driver unit 610 is coupled with the plural external gate connection lines G.

The multiplexer circuit 620 is coupled with the plural external source connection lines S, with the plural external capacitor connection lines C, and with the plural external protection electrode connection lines E.

The source driver unit 630 is coupled with the multiplexer circuit 620.

The touch control unit 640 is coupled with the multiplexer circuit 620.

When in operation, the multiplexer circuit 620 will couple the touch control unit 640 with the plural external protection electrode connection lines E; couple the source driver unit 630 with the plural external source connection lines S and with the plural external storage capacitor connection lines C during a display period; and couple the touch control unit 640 with the plural external source connection lines S and with the plural external storage capacitor connection lines C during a touch detection period. The touch control unit 640 will perform a touch detection procedure during the touch detection period, the touch detection procedure being selected from a group consisting of a self-capacitor touch detection procedure, a mutual-capacitor touch detection procedure, and any combination thereof.

Please refer to FIG. 11, which illustrates another embodiment of the touch display having IPS liquid crystal structure of the present invention. As illustrated in FIG. 11, the touch display has a pixel array 700, a gate driver unit 710, a multiplexer circuit 720, a source driver unit 730, and a touch control unit 740.

The pixel array 700 has plural external source connection lines S, plural external gate connection lines G, plural external storage capacitor connection lines $C_S$, plural external counter electrode connection lines C, and plural pixel cells 300, wherein each of the plural pixel cells 300 (please refer to FIG. 5) includes: a first substrate 310; a counter electrode 321 located on the first substrate 310; a storage capacitor bottom electrode 322 located on the first substrate 310 and separated from the counter electrode 321; a storage capacitor connection line 323 coupled electrically with the storage capacitor bottom electrode 322 and with one of the plural external storage capacitor connection lines $C_S$; an insulation layer 330 located on the counter electrode 321 and on the storage capacitor bottom electrode 322; a thin film transistor 341 located on the insulation layer 330 and having a gate, a source, and a drain; a pixel electrode 342 located on the insulation layer 330 and coupled electrically with the drain; a storage capacitor top electrode 345 located on the insulation layer 330 and coupled electrically with the pixel electrode 342; a gate connection line 344 coupled electrically with the gate and with one of the plural external gate connection lines G; a source connection line 343 coupled electrically with the source and with one of the plural external source connection lines S; a liquid crystal layer 350 located on the thin film transistor 341, on the pixel electrode 342, and on the storage capacitor top electrode 345; and a second substrate 360 located on the liquid crystal layer 350.

The gate driver unit 710 is coupled with the plural external gate connection lines G.

The multiplexer circuit 720 is coupled with the plural external source connection lines S, with the plural external storage capacitor connection lines $C_S$, and with the plural external counter electrode connection lines C.

The source driver unit 730 is coupled with the multiplexer circuit 720.

The touch control unit 740 is coupled with the multiplexer circuit 720.

When in operation, the multiplexer circuit 720 will couple the source driver unit 730 with the plural external source connection lines S, with the plural external storage capacitor connection lines $C_S$, and with the plural external counter electrode connection lines C during a display period; and couple the touch control unit 740 with the plural external source connection lines S, with the plural external storage capacitor connection lines $C_S$, and with the plural external counter electrode connection lines C during a touch detection period. The touch control unit 740 will perform a touch detection procedure during the touch detection period, the touch detection procedure being selected from a group consisting of a self-capacitor touch detection procedure, a mutual-capacitor touch detection procedure, and any combination thereof.

Please refer to FIG. 12, which illustrates still another embodiment of the touch display having IPS liquid crystal structure of the present invention. As illustrated in FIG. 12, the touch display has a pixel array 800, a gate driver unit 810, a multiplexer circuit 820, a source driver unit 830, and a touch control unit 840.

The pixel array 800 has plural external source connection lines S, plural external gate connection lines G, plural external storage capacitor connection lines $C_S$, plural external counter electrode connection lines C, plural external protection electrode connection lines E, and plural pixel cells 400, wherein each of the plural pixel cells 400 (please refer to FIG. 7) includes: a first substrate 410; a counter electrode 421 located on the first substrate 410; a storage capacitor bottom electrode 422 located on the first substrate 410 and separated from the counter electrode 421; a storage capacitor connection line 423 coupled electrically with the storage capacitor bottom electrode 422 and with one of the plural external storage capacitor connection lines $C_S$; an insulation layer 430 located on the counter electrode 421 and on the storage capacitor bottom electrode 422; a thin film transistor 441 located on the insulation layer 430 and having a gate, a source, and a drain; a pixel electrode 442 located on the insulation layer 430 and coupled electrically with the drain; a storage capacitor top electrode 445 located on the insulation layer 430 and coupled electrically with the pixel electrode 442; a gate connection line 444 coupled electrically with the gate and with one of the plural external gate connection lines G; a source connection line 443 coupled electrically with the source and with one of the plural external source connection lines S; a liquid crystal layer 450 located on the thin film transistor 441, on the pixel electrode 442, and on the storage capacitor top electrode 445; a protection electrode 460, which is a transparent electrode located on the liquid crystal layer 450 and can be made of ITO; a protection electrode connection line 461, which is coupled electrically with the protection electrode 460 and can be made of metal; and a second substrate 470 located on the protection electrode 460.

The gate driver unit 810 is coupled with the plural external gate connection lines G.

The multiplexer circuit 820 is coupled with the plural external source connection lines S, with the plural external storage capacitor connection lines $C_S$, with the plural external counter electrode connection lines C, and with the plural external protection electrode connection lines E.

The source driver unit 830 is coupled with the multiplexer circuit 820.

The touch control unit 840 is coupled with the multiplexer circuit 820.

When in operation, the multiplexer circuit 820 will couple the touch control unit 840 with the plural external protection electrode connection lines E; couple the source driver unit 830 with the plural external source connection lines S, with the plural external storage capacitor connection lines $C_S$, and the plural external counter electrode connection lines C during a display period; and couple the touch control unit 840 with the plural external source connection lines S, with the plural external storage capacitor connection lines $C_S$, and the plural external counter electrode connection lines C during a touch detection period. The touch control unit 840 will perform a touch detection procedure during the touch detection period, the touch detection procedure being selected from a group consisting of a self-capacitor touch detection procedure, a mutual-capacitor touch detection procedure, and any combination thereof.

Thanks to the novel designs mentioned above, the present invention possesses the following advantages:

1. The touch display of the present invention is capable of using an in-plane-switching liquid crystal structure to provide a touch function.

2. The touch display of the present invention is capable of using two electrode layers of an in-plane-switching liquid crystal structure to perform a self-capacitor touch detection procedure or a mutual-capacitor touch detection procedure.

3. The touch display of the present invention is capable of using a pixel electrode layer, a counter electrode layer, and a protection electrode layer to perform a self-capacitor touch detection procedure or a mutual-capacitor touch detection procedure.

4. The touch display of the present invention is capable of using a voltage bias technique to enhance the reliability of touch detection.

5. The touch display of the present invention is capable of providing dual touch planes.

6. The touch display of the present invention is capable of simplifying the structure of a touch screen to reduce the depth, enhance the yield rate, and lower down the cost thereof.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch display having in-plane-switching liquid crystal structure, which includes a pixel cell and a multiplexer circuit for providing a display function and a touch detection function, wherein said pixel cell comprises:
   a first substrate;
   a counter electrode located on said first substrate;
   a storage capacitor bottom electrode located on said first substrate and separated from said counter electrode;
   a storage capacitor connection line coupled electrically with said storage capacitor bottom electrode;
   a counter electrode connection line coupled electrically with said counter electrode;
   an insulation layer having a first surface and a second surface, the first and second surfaces being on opposite sides of the insulation layer, the first surface being in direct contact with said counter electrode and with said storage capacitor bottom electrode;
   a thin film transistor located on the second surface of said insulation layer and having a gate, a source, and a drain;
   a pixel electrode located on said second surface of said insulation layer and coupled electrically with said drain;
   a storage capacitor top electrode located on said second surface of said insulation layer and being directly coupled electrically with said pixel electrode;
   a gate connection line coupled electrically with said gate;
   a source connection line coupled electrically with said source; and
   a liquid crystal layer located on said thin film transistor, on said pixel electrode, and on said storage capacitor top electrode; and
   said multiplexer circuit comprises:
   a first multiplexer having a first contact, a second contact, and a third contact, wherein, said first contact is coupled with said source connection line, said second contact is coupled with a source driver unit, said third contact is coupled with a touch control unit, said first contact is coupled electrically with said second contact during a display period, and said first contact is coupled electrically with said third contact during a touch detection period;

a second multiplexer having a fourth contact, a fifth contact, and a sixth contact, wherein, said fourth contact is coupled with said storage capacitor connection line, said fifth contact is coupled with a common voltage, said sixth contact is coupled with said touch control unit, said fourth contact is coupled electrically with said fifth contact during said display period, and said fourth contact is coupled electrically with said sixth contact during said touch detection period; and a third multiplexer having a seventh contact, an eighth contact, and a ninth contact, wherein, said seventh contact is coupled with said counter electrode, said eighth contact is coupled with said common voltage, said ninth contact is coupled with said touch control unit, said seventh contact is coupled electrically with said eighth contact during said display period, and said seventh contact is coupled electrically with said ninth contact during said touch detection period.

2. The touch display having in-plane-switching liquid crystal structure as claim 1, wherein said pixel cell further comprises:
a protection electrode located on said liquid crystal layer; and
a protection electrode connection line coupled electrically with said protection electrode and with said touch control unit.

3. The touch display having in-plane-switching liquid crystal structure as claim 2, wherein said pixel cell further comprises a second substrate on said protection electrode.

4. The touch display having in-plane-switching liquid crystal structure as claim 1, wherein said pixel cell further comprises a second substrate on said liquid crystal layer.

5. A touch display having in-plane-switching liquid crystal structure, comprising:
a pixel array having plural external source connection lines, plural external gate connection lines, plural external storage capacitor connection lines, and plural pixel cells, each of said plural pixel cells comprising:
a first substrate;
a counter electrode located on said first substrate;
a storage capacitor bottom electrode located on said first substrate and separated from said counter electrode;
a storage capacitor connection line located on said first substrate and coupled electrically with said counter electrode, with said storage capacitor bottom electrode, and with one of said plural external storage capacitor connection lines;
an insulation layer having a first surface and a second surface, the first and second surfaces being on opposite sides of the insulation layer, the first surface being in direct contact with said counter electrode and with said storage capacitor bottom electrode;
a thin film transistor located on the second surface of said insulation layer and having a gate, a source, and a drain;
a pixel electrode located on said second surface of said insulation layer and coupled electrically with said drain;
a storage capacitor top electrode located on said second surface of said insulation layer and being directly coupled electrically with said pixel electrode;

a gate connection line coupled electrically with said gate and with one of said plural external gate connection lines;
a source connection line coupled electrically with said source and with one of said plural external source connection lines; and
a liquid crystal layer located on said thin film transistor, on said pixel electrode, and on said storage capacitor top electrode;
a gate driver unit coupled with said plural external gate connection lines;
a multiplexer circuit coupled with said plural external source connection lines and with said plural external storage capacitor connection lines;
a source driver unit coupled with said multiplexer circuit; and
a touch control unit coupled with said multiplexer circuit;
wherein said multiplexer circuit couples said source driver unit with said plural external source connection lines and with said plural external storage capacitor connection lines during a display period, and couples said touch control unit with said plural external source connection lines and with said plural external storage capacitor connection lines during a touch detection period.

6. The touch display having in-plane-switching liquid crystal structure as claim 5, wherein said touch control unit performs a touch detection procedure during said touch detection period, and said touch detection procedure is selected from a group consisting of a self-capacitor touch detection procedure, a mutual-capacitor touch detection procedure, and any combination thereof.

7. The touch display having in-plane-switching liquid crystal structure as claim 5, wherein each of said plural pixel cells further comprises:
plural protection electrodes located on said liquid crystal layer; and
plural external protection electrode connection lines, each of which being coupled electrically with one of said plural protection electrodes and with said multiplexer circuit;
wherein said plural external protection electrode connection lines are coupled to said touch control unit via said multiplexer circuit.

8. The touch display having in-plane-switching liquid crystal structure as claim 7, wherein said touch control unit performs a touch detection procedure during said touch detection period, and said touch detection procedure is selected from a group consisting of a self-capacitor touch detection procedure, a mutual-capacitor touch detection procedure, and any combination thereof.

9. The touch display having in-plane-switching liquid crystal structure as claim 7, wherein each of said plural pixel cells further comprises a second substrate on said protection electrode.

10. The touch display having in-plane-switching liquid crystal structure as claim 5, wherein each of said plural pixel cells further comprises a second substrate on said liquid crystal layer.

11. A touch display having in-plane-switching liquid crystal structure, comprising:
a pixel array having plural external source connection lines, plural external gate connection lines, plural external storage capacitor connection lines, plural external counter electrode connection lines and plural pixel cells, each of said plural pixel cells comprising:
a first substrate;
a counter electrode located on said first substrate;

a storage capacitor bottom electrode located on said first substrate and separated from said counter electrode;

a storage capacitor connection line located on said first substrate and coupled electrically with said storage capacitor bottom electrode and with one of said plural external storage capacitor connection lines;

a counter electrode connection line located on said first substrate and coupled electrically with said counter electrode and with one of said plural external counter electrode connection lines;

an insulation layer having a first surface and a second surface, the first and second surfaces being on opposite sides of the insulation layer, the first surface being in direct contact with said counter electrode and with said storage capacitor bottom electrode;

a thin film transistor located on the second surface of said insulation layer and having a gate, a source, and a drain;

a pixel electrode located on said second surface of said insulation layer and coupled electrically with said drain;

a storage capacitor top electrode located on said second surface of said insulation layer and being directly coupled electrically with said pixel electrode;

a gate connection line coupled electrically with said gate and with one of said plural external gate connection lines;

a source connection line coupled electrically with said source and with one of said plural external source connection lines; and a liquid crystal layer located on said thin film transistor, on said pixel electrode, and on said storage capacitor top electrode;

a gate driver unit coupled with said plural external gate connection lines;

a multiplexer circuit coupled with said plural external source connection lines, with said plural external storage capacitor connection lines, and with said plural external counter electrode connection lines;

a source driver unit coupled with said multiplexer circuit; and a touch control unit coupled with said multiplexer circuit;

wherein said multiplexer circuit couples said source driver unit with said plural external source connection lines, with said plural external storage capacitor connection lines, and with said plural external counter electrode connection lines during a display period, and couples said touch control unit with said plural external source connection lines, with said plural external storage capacitor connection lines, and with said plural external counter electrode connection lines during a touch detection period.

12. The touch display having in-plane-switching liquid crystal structure as claim 11, wherein said touch control unit performs a touch detection procedure during said touch detection period, and said touch detection procedure is selected from a group consisting of a self-capacitor touch detection procedure, a mutual-capacitor touch detection procedure, and any combination thereof.

13. The touch display having in-plane-switching liquid crystal structure as claim 11, wherein each of said plural pixel cells further comprises:

plural protection electrodes located on said liquid crystal layer; and plural external protection electrode connection lines, each of which being coupled electrically with one of said plural protection electrodes and with said multiplexer circuit;

wherein said plural external protection electrode connection lines are coupled to said touch control unit via said multiplexer circuit.

14. The touch display having in-plane-switching liquid crystal structure as claim 13, wherein said touch control unit performs a touch detection procedure during said touch detection period, and said touch detection procedure is selected from a group consisting of a self-capacitor touch detection procedure, a mutual-capacitor touch detection procedure, and any combination thereof.

15. The touch display having in-plane-switching liquid crystal structure as claim 13, wherein each of said plural pixel cells further comprises a second substrate on said protection electrode.

16. The touch display having in-plane-switching liquid crystal structure as claim 11, wherein each of said plural pixel cells further comprises a second substrate on said liquid crystal layer.

* * * * *